(12) United States Patent
Ren et al.

(10) Patent No.: US 12,555,869 B2
(45) Date of Patent: Feb. 17, 2026

(54) BATTERY TRAY AND POWER BATTERY PACK

(71) Applicant: BYD COMPANY LIMITED, Guangdong (CN)

(72) Inventors: Zhenghua Ren, Shenzhen (CN); Zhipei Lu, Shenzhen (CN); Kun Guo, Shenzhen (CN); Qingbo Peng, Shenzhen (CN); Yan Zhu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 250 days.

(21) Appl. No.: 17/419,443

(22) PCT Filed: Jul. 30, 2019

(86) PCT No.: PCT/CN2019/098441
§ 371 (c)(1),
(2) Date: Jun. 29, 2021

(87) PCT Pub. No.: WO2020/134070
PCT Pub. Date: Jul. 2, 2020

(65) Prior Publication Data
US 2022/0077539 A1 Mar. 10, 2022

(30) Foreign Application Priority Data
Dec. 29, 2018 (CN) .......................... 201811642595.5

(51) Int. Cl.
*H01M 50/383* (2021.01)
*A62C 3/07* (2006.01)
(Continued)

(52) U.S. Cl.
CPC ............. *H01M 50/383* (2021.01); *A62C 3/07* (2013.01); *A62C 3/16* (2013.01); *H01M 10/48* (2013.01);
(Continued)

(58) Field of Classification Search
CPC ............... H01M 50/383; H01M 10/48; H01M 50/249; H01M 50/271; H01M 50/317;
(Continued)

(56) References Cited

U.S. PATENT DOCUMENTS 5,620,057 A * 4/1997 Klemen ................. B60K 11/06
180/68.5
7,618,740 B2  11/2009 Hamada et al.
(Continued)

FOREIGN PATENT DOCUMENTS

CN        1134041 A     10/1996
CN     2003007345 A      1/2003
(Continued)

OTHER PUBLICATIONS

International Search Report of PCT/CN2019/098441 dated Sep. 27, 2019.
(Continued)

*Primary Examiner* — Jessie Walls-Murray
(74) *Attorney, Agent, or Firm* — Calfee, Halter & Griswold LLP

(57) ABSTRACT

The present disclosure relates to a battery tray and a power battery pack. The battery tray includes a tray body. The tray body includes a base plate and a side beam, and the side beam is disposed around the base plate and defines, together with the base plate, an accommodating space for battery cells. The base plate is formed therein with an air passage, and the base plate is provided with several inlet vents and at least one exhaust vent. The inlet vent is configured to
(Continued)

introduce a flame, smoke or gas discharged from the battery cell into the air passage, and the exhaust vent is configured to discharge the flame, smoke or gas inside the air passage.

21 Claims, 11 Drawing Sheets

(51) Int. Cl.
| | |
|---|---|
| A62C 3/16 | (2006.01) |
| H01M 10/48 | (2006.01) |
| H01M 50/209 | (2021.01) |
| H01M 50/249 | (2021.01) |
| H01M 50/271 | (2021.01) |
| H01M 50/30 | (2021.01) |
| H01M 50/317 | (2021.01) |
| H01M 50/367 | (2021.01) |

(52) U.S. Cl.
CPC ....... *H01M 50/249* (2021.01); *H01M 50/271* (2021.01); *H01M 50/317* (2021.01); *H01M 50/367* (2021.01); *H01M 50/394* (2021.01); *H01M 50/209* (2021.01); *H01M 2220/20* (2013.01)

(58) Field of Classification Search
CPC ............. H01M 50/394; H01M 50/209; H01M 2220/20; H01M 50/342; H01M 50/367; H01M 2200/20; H01M 50/358; H01M 50/3425; H01M 10/655; H01M 10/6566; H01M 10/6557; A62C 3/07; A62C 3/16; Y02E 60/10
See application file for complete search history.

(56) References Cited

U.S. PATENT DOCUMENTS

| | | | |
|---|---|---|---|
| 8,268,469 | B2 | 9/2012 | Hermann et al. |
| 8,642,204 | B2 | 2/2014 | Higashino et al. |
| 8,910,737 | B2 | 12/2014 | Saeki |
| 9,017,845 | B2 | 4/2015 | Bender et al. |
| 9,283,837 | B1 | 3/2016 | Rawlinson |
| 9,306,201 | B2 | 4/2016 | Lu et al. |
| 9,337,458 | B2 | 5/2016 | Kim |
| 9,437,854 | B2 | 9/2016 | Shimizu et al. |
| 9,444,082 | B2 | 9/2016 | Tsujimura et al. |
| 9,806,312 | B2 | 10/2017 | Li et al. |
| 9,806,386 | B2 | 10/2017 | Lim |
| 9,843,027 | B1 | 12/2017 | Spotnitz et al. |
| 10,059,382 | B2 | 8/2018 | Nusier et al. |
| 10,099,546 | B2 | 10/2018 | Hara et al. |
| 11,088,412 | B2 | 8/2021 | Matecki et al. |
| 2002/0086578 | A1 | 7/2002 | Ikeda |
| 2003/0152825 | A1 | 8/2003 | Siddiqui et al. |
| 2004/0058233 | A1 | 3/2004 | Hamada et al. |
| 2007/0015049 | A1 | 1/2007 | Hamada et al. |
| 2009/0136806 | A1 | 5/2009 | Imanishi et al. |
| 2011/0003198 | A1 | 1/2011 | Noda et al. |
| 2011/0027632 | A1 | 2/2011 | Higashino et al. |
| 2011/0174556 | A1* | 7/2011 | Hermann ................ B60L 50/64 429/62 |
| 2012/0028105 | A1 | 2/2012 | Kumar et al. |
| 2012/0114993 | A1 | 5/2012 | Park |
| 2012/0261206 | A1 | 10/2012 | Yasui et al. |
| 2013/0130070 | A1 | 5/2013 | Adachi et al. |
| 2013/0175829 | A1 | 7/2013 | Kim et al. |
| 2014/0020969 | A1 | 1/2014 | Okada et al. |
| 2014/0072835 | A1 | 3/2014 | Tsujimura et al. |
| 2014/0093756 | A1 | 4/2014 | Nemoto et al. |
| 2014/0120391 | A1 | 5/2014 | Park |
| 2014/0127537 | A1 | 5/2014 | Pflueger et al. |
| 2014/0186677 | A1 | 7/2014 | Lim |
| 2014/0308550 | A1* | 10/2014 | Shimizu ............. H01M 50/213 429/56 |
| 2015/0081298 | A1 | 3/2015 | Ding et al. |
| 2015/0086842 | A1 | 3/2015 | Kang et al. |
| 2015/0140369 | A1* | 5/2015 | Itoi ..................... H01M 50/204 429/53 |
| 2015/0303422 | A1 | 10/2015 | Poller et al. |
| 2016/0006006 | A1 | 1/2016 | Motokawa et al. |
| 2016/0064781 | A1 | 3/2016 | Specht et al. |
| 2016/0093843 | A1 | 3/2016 | Reineccius et al. |
| 2016/0133889 | A1 | 5/2016 | Tseng et al. |
| 2016/0133900 | A1 | 5/2016 | Li et al. |
| 2016/0133901 | A1 | 5/2016 | Li et al. |
| 2016/0141738 | A1 | 5/2016 | Kwag |
| 2016/0167544 | A1 | 6/2016 | Barbat et al. |
| 2016/0204404 | A1 | 7/2016 | Shimizu et al. |
| 2016/0226034 | A1 | 8/2016 | Seok et al. |
| 2016/0301045 | A1 | 10/2016 | Tyler et al. |
| 2017/0088182 | A1 | 3/2017 | Hara |
| 2017/0190264 | A1 | 7/2017 | Kim et al. |
| 2017/0214008 | A9 | 7/2017 | Mardall et al. |
| 2017/0237113 | A1 | 8/2017 | Ruehle et al. |
| 2017/0331090 | A1 | 11/2017 | Li et al. |
| 2018/0013105 | A1 | 1/2018 | Wuensche et al. |
| 2018/0013113 | A1 | 1/2018 | Wuensche et al. |
| 2018/0029493 | A1 | 2/2018 | Kobayashi et al. |
| 2018/0040930 | A1* | 2/2018 | Addanki ............. H01M 50/271 |
| 2018/0166735 | A1 | 6/2018 | Lee et al. |
| 2018/0194235 | A1 | 7/2018 | Kim et al. |
| 2018/0229593 | A1 | 8/2018 | Hitz et al. |
| 2018/0287213 | A1 | 10/2018 | Sato et al. |
| 2018/0337374 | A1 | 11/2018 | Matecki et al. |
| 2018/0337378 | A1 | 11/2018 | Stephens et al. |
| 2018/0358593 | A1 | 12/2018 | Seo et al. |
| 2018/0366717 | A1 | 12/2018 | Hu et al. |
| 2019/0044114 | A1 | 2/2019 | Demar |
| 2020/0140018 | A1 | 5/2020 | Grottke et al. |
| 2020/0212385 | A1 | 7/2020 | Shi et al. |
| 2020/0295322 | A1 | 9/2020 | Gunther |

FOREIGN PATENT DOCUMENTS

| | | |
|---|---|---|
| CN | 101034753 A | 9/2007 |
| CN | 101079477 A | 11/2007 |
| CN | 101145059 A | 3/2008 |
| CN | 101305488 A | 11/2008 |
| CN | 201146206 Y | 11/2008 |
| CN | 101521265 A | 9/2009 |
| CN | 101877413 A | 11/2010 |
| CN | 201766132 U | 3/2011 |
| CN | 102007619 A | 4/2011 |
| CN | 102104122 A | 6/2011 |
| CN | 202034426 U | 11/2011 |
| CN | 202210539 U | 5/2012 |
| CN | 202217748 U | 5/2012 |
| CN | 202268403 U | 6/2012 |
| CN | 202268412 U | 6/2012 |
| CN | 202332978 U | 7/2012 |
| CN | 202373642 U | 8/2012 |
| CN | 102683907 A | 9/2012 |
| CN | 102893426 A | 1/2013 |
| CN | 202712297 U | 1/2013 |
| CN | 102956934 A | 3/2013 |
| CN | 102007016 B | 6/2013 |
| CN | 103269941 A | 8/2013 |
| CN | 203150637 U | 8/2013 |
| CN | 103296302 A | 9/2013 |
| CN | 103824984 A | 5/2014 |
| CN | 203600973 U | 5/2014 |
| CN | 103928642 A | 7/2014 |
| CN | 103931020 A | 7/2014 |
| CN | 203760534 U | 8/2014 |
| CN | 204130608 U | 10/2014 |
| CN | 102823054 B | 12/2014 |
| CN | 203983373 U | 12/2014 |
| CN | 204029891 U | 12/2014 |
| CN | 104319360 A | 1/2015 |
| CN | 204189846 U | 3/2015 |
| CN | 104576999 A | 4/2015 |

(56) References Cited

FOREIGN PATENT DOCUMENTS

| | | | |
|---|---|---|---|
| CN | 204577542 U | 5/2015 |
| CN | 104733667 A | 6/2015 |
| CN | 104795527 A | 7/2015 |
| CN | 204857906 U | 7/2015 |
| CN | 204614833 U | 9/2015 |
| CN | 204651372 U | 9/2015 |
| CN | 204668376 U | 9/2015 |
| CN | 204732461 U | 10/2015 |
| CN | 105024112 A | 11/2015 |
| CN | 204809680 U | 11/2015 |
| CN | 204885223 U | 12/2015 |
| CN | 105322222 A | 2/2016 |
| CN | 105489828 A | 4/2016 |
| CN | 205159465 U | 4/2016 |
| CN | 205282524 U | 6/2016 |
| CN | 205282525 U | 6/2016 |
| CN | 105762316 A | 7/2016 |
| CN | 205488247 U | 8/2016 |
| CN | 103035975 B | 9/2016 |
| CN | 205621793 U | 10/2016 |
| CN | 106182714 A | 12/2016 |
| CN | 106257714 A | 12/2016 |
| CN | 106299166 A | 1/2017 |
| CN | 205900631 U | 1/2017 |
| CN | 205900638 U | 1/2017 |
| CN | 106450089 A | 2/2017 |
| CN | 205960060 U | 2/2017 |
| CN | 106486625 A | 3/2017 |
| CN | 205992578 U | 3/2017 |
| CN | 206040913 U | 3/2017 |
| CN | 106558659 A | 4/2017 |
| CN | 106575728 A | 4/2017 |
| CN | 106605314 A | 4/2017 |
| CN | 206134803 U | 4/2017 |
| CN | 206134820 U | 4/2017 |
| CN | 106627081 A | 5/2017 |
| CN | 106654114 A | 5/2017 |
| CN | 106684287 A | 5/2017 |
| CN | 206259400 U | 6/2017 |
| CN | 106953039 A | 7/2017 |
| CN | 106992273 A | 7/2017 |
| CN | 206364073 U | 7/2017 |
| CN | 107112443 | 8/2017 |
| CN | 206374545 U | 8/2017 |
| CN | 107123769 A | 9/2017 |
| CN | 107195829 A | 9/2017 |
| CN | 206532801 U | 9/2017 |
| CN | 105244462 B | 10/2017 |
| CN | 107248557 A | 10/2017 |
| CN | 107256932 A | 10/2017 |
| CN | 107275710 A | 10/2017 |
| CN | 107293809 A | 10/2017 |
| CN | 206595314 U | 10/2017 |
| CN | 107394063 A | 11/2017 |
| CN | 107394279 A | 11/2017 |
| CN | 107437594 A | 12/2017 |
| CN | 107482141 A | 12/2017 |
| CN | 107611296 A | 1/2018 |
| CN | 107644962 A | 1/2018 |
| CN | 206849954 U | 1/2018 |
| CN | 206864505 U | 1/2018 |
| CN | 206893769 U | 1/2018 |
| CN | 107768560 A | 3/2018 |
| CN | 107785511 A | 3/2018 |
| CN | 107833996 A | 3/2018 |
| CN | 207097887 U | 3/2018 |
| CN | 107887536 A | 4/2018 |
| CN | 107925028 A | 4/2018 |
| CN | 107946506 A | 4/2018 |
| CN | 107946692 A | 4/2018 |
| CN | 207183353 U | 4/2018 |
| CN | 207233816 U | 4/2018 |
| CN | 207233915 U | 4/2018 |
| CN | 105845860 B | 5/2018 |
| CN | 107978800 A | 5/2018 |
| CN | 108011069 A | 5/2018 |
| CN | 108075063 | 5/2018 |
| CN | 108075065 A | 5/2018 |
| CN | 207381449 U | 5/2018 |
| CN | 207398218 U | 5/2018 |
| CN | 207425959 U | 5/2018 |
| CN | 207459036 U | 6/2018 |
| CN | 207474601 U | 6/2018 |
| CN | 207530003 U | 6/2018 |
| CN | 207559010 U | 6/2018 |
| CN | 207664083 U | 7/2018 |
| CN | 108370075 A | 8/2018 |
| CN | 108389986 A | 8/2018 |
| CN | 108417747 A | 8/2018 |
| CN | 207705320 U | 8/2018 |
| CN | 207743264 U | 8/2018 |
| CN | 207743294 U | 8/2018 |
| CN | 207781672 U | 8/2018 |
| CN | 207800740 U | 8/2018 |
| CN | 108493384 A | 9/2018 |
| CN | 108598354 A | 9/2018 |
| CN | 207818679 U | 9/2018 |
| CN | 207818697 U | 9/2018 |
| CN | 207818836 U | 9/2018 |
| CN | 207868256 U | 9/2018 |
| CN | 207967121 U | 10/2018 |
| CN | 207967123 U | 10/2018 |
| CN | 208014765 U | 10/2018 |
| CN | 208014778 U | 10/2018 |
| CN | 108749548 A | 11/2018 |
| CN | 108777268 A | 11/2018 |
| CN | 108933203 A | 12/2018 |
| CN | 108933296 A | 12/2018 |
| CN | 108963184 A | 12/2018 |
| CN | 208189676 U | 12/2018 |
| CN | 208256735 U | 12/2018 |
| CN | 208256768 U | 12/2018 |
| CN | 208256770 U | 12/2018 |
| CN | 109148771 A | 1/2019 |
| CN | 208336298 U | 1/2019 |
| CN | 109346637 A | 2/2019 |
| CN | 110088937 A | 8/2019 |
| CN | 110165115 A | 8/2019 |
| CN | 110165117 A | 8/2019 |
| CN | 110190211 A | 8/2019 |
| CN | 110190212 A | 8/2019 |
| CN | 107681076 B | 12/2020 |
| DE | 4407156 C1 | 6/1995 |
| DE | 10328209 A1 | 1/2005 |
| DE | 102017206566 A1 | 10/2017 |
| DE | 202017101961 U1 | 8/2018 |
| DE | 102017204412 A1 | 9/2018 |
| DE | 102017209342 A1 | 12/2018 |
| DE | 102018102352 A1 * | 7/2019 |
| EP | 638951 A2 | 2/1995 |
| EP | 1978578 A2 | 10/2008 |
| EP | 2266151 A1 | 12/2010 |
| EP | 2490276 A2 | 8/2012 |
| EP | 2562843 A1 | 2/2013 |
| EP | 2565958 A1 | 3/2013 |
| EP | 2654100 A1 | 10/2013 |
| EP | 2693515 | 2/2014 |
| EP | 2693515 A1 | 2/2014 |
| EP | 2573834 B1 | 4/2014 |
| EP | 3004246 A1 | 4/2016 |
| EP | 3279970 A1 | 2/2018 |
| EP | 2698862 | 5/2018 |
| EP | 3331055 A1 | 6/2018 |
| EP | 3386001 A1 | 10/2018 |
| EP | 3386002 A1 | 10/2018 |
| EP | 3422441 A1 | 1/2019 |
| EP | 3021379 B1 | 7/2019 |
| EP | 3125334 | 10/2020 |
| EP | 3345783 A1 | 3/2022 |
| FR | 2951029 A1 | 4/2011 |
| HK | 1207922 A1 | 2/2016 |
| JP | 02138858 A | 5/1990 |
| JP | 07186734 A | 7/1995 |
| JP | 09274899 A | 10/1997 |

(56) References Cited

FOREIGN PATENT DOCUMENTS

| | | | |
|---|---|---|---|
| JP | 2000351328 A | | 12/2000 |
| JP | 2001256942 A | | 9/2001 |
| JP | 2001313009 A | | 11/2001 |
| JP | 2002298827 A | | 10/2002 |
| JP | 2006054189 A | | 2/2006 |
| JP | 2007027011 A | * | 2/2007 |
| JP | 2007134178 A | | 5/2007 |
| JP | 2008117765 A | | 5/2008 |
| JP | 2008171628 A | | 7/2008 |
| JP | 2009277647 A | | 11/2009 |
| JP | 2012064358 A | | 3/2012 |
| JP | 2012119138 A | | 6/2012 |
| JP | 2012243438 A | | 12/2012 |
| JP | 2013069691 A | | 4/2013 |
| JP | 5331517 B2 | | 10/2013 |
| JP | 2013211197 A | | 10/2013 |
| JP | 5384432 B2 | | 1/2014 |
| JP | 2014022277 A | | 2/2014 |
| JP | 2014080116 A | | 5/2014 |
| JP | 2014164795 A | | 9/2014 |
| JP | 2015022915 A | | 2/2015 |
| JP | 2015057759 A | | 3/2015 |
| JP | 2015118799 A | | 6/2015 |
| JP | 5903607 B2 | | 4/2016 |
| JP | 2016096129 A | | 5/2016 |
| JP | 2016100308 A | | 5/2016 |
| JP | 2016122572 A | | 7/2016 |
| JP | 2017054683 A | | 3/2017 |
| JP | 2017111893 A | | 6/2017 |
| JP | 2017162806 A | | 9/2017 |
| JP | 2017196941 A | | 11/2017 |
| JP | 2017196959 A | | 11/2017 |
| JP | 2017197093 A | | 11/2017 |
| JP | 2017228391 A | | 12/2017 |
| JP | 2018073552 A | | 5/2018 |
| JP | 2018077979 A | | 5/2018 |
| JP | 2018106822 A | | 7/2018 |
| JP | 2018110048 A | | 7/2018 |
| JP | 2018527704 A | | 9/2018 |
| JP | 2018176961 A | | 11/2018 |
| JP | 2018206495 A | | 12/2018 |
| JP | 2018536975 A | | 12/2018 |
| JP | 2019056716 A | | 4/2019 |
| KR | 20090000307 | | 1/2009 |
| KR | 1020090000307 A | | 1/2009 |
| KR | 20120049020 | | 5/2012 |
| KR | 1020120049020 A | | 5/2012 |
| KR | 20130076660 | | 7/2013 |
| KR | 1020130076660 A | | 7/2013 |
| KR | 20130116342 | | 10/2013 |
| KR | 1020130116342 A | | 10/2013 |
| KR | 1020130140245 A | | 12/2013 |
| KR | 20140042737 | | 4/2014 |
| KR | 20140089067 A | | 7/2014 |
| KR | 20140138674 A | | 12/2014 |
| KR | 1020140138674 A | | 12/2014 |
| KR | 1020160076156 A | | 6/2016 |
| KR | 1020160094235 A | | 8/2016 |
| KR | 101669118 B1 | | 10/2016 |
| KR | 1020170023595 A | | 3/2017 |
| KR | 20170044473 | | 4/2017 |
| KR | 1020170053429 A | | 5/2017 |
| KR | 20170090261 A | | 8/2017 |
| KR | 1020180081000 A | | 7/2018 |
| KR | 20180116339 A | | 10/2018 |
| KR | 1020180112617 A | | 10/2018 |
| KR | 1020190000211 A | | 1/2019 |
| TW | 364221 | | 7/1999 |
| TW | 200840170 A | | 10/2008 |
| TW | I 319637 | | 1/2010 |
| TW | I 525879 | | 3/2016 |
| WO | 2009128214 A1 | | 10/2009 |
| WO | 2010114317 A2 | | 10/2010 |
| WO | 2012039013 A1 | | 3/2012 |
| WO | 2013031614 A1 | | 3/2013 |
| WO | 2013069308 A1 | | 5/2013 |
| WO | 2013161370 A1 | | 10/2013 |
| WO | 2014065110 A1 | | 5/2014 |
| WO | 2015173999 A1 | | 11/2015 |
| WO | 2015186849 A1 | | 12/2015 |
| WO | 2016174855 A1 | | 11/2016 |
| WO | 2017078264 A1 | | 5/2017 |
| WO | 2017143754 A1 | | 8/2017 |
| WO | 2018087681 A1 | | 5/2018 |
| WO | 2018123574 A1 | | 7/2018 |
| WO | 2018125641 A1 | | 7/2018 |
| WO | 2018186582 A1 | | 10/2018 |
| WO | 2018198895 A1 | | 11/2018 |
| WO | 2019001357 A1 | | 1/2019 |
| WO | 2019127957 A1 | | 7/2019 |

OTHER PUBLICATIONS

International Search Report of PCT/CN2019/092351 dated Oct. 11, 2019 (2 pages).
International Search Report of PCT/CN2019/092393 dated Oct. 8, 2019 (2 pages).
BYD Europe, Nail Penetration Test on the BYD Blade Battery and NCM Batter; https://www.youtube.com/watch?v=CSGEsKhtZD0; Published Sep. 26, 2021.
Office Action from U.S. Appl. No. 17/049,732 dated Jan. 18, 2023.
International Search Report of PCT/CN2019/097479 dated Oct. 16, 2019.
International Search Report of PCT/CN2019/097640 dated Oct. 16, 2019.
International Search Report of PCT/CN2019/092390 dated Sep. 6, 2019.
4 International Search Report of PCT/CN2019/098441 dated Sep. 27, 2019.
Office Action from U.S. Appl. No. 17/421,875 dated Oct. 2, 2023.
Office Action from U.S. Appl. No. 17/421,895 dated Oct. 23, 2023.

\* cited by examiner

BATTERY TRAY AND POWER BATTERY PACK

CROSS-REFERENCE TO RELATED APPLICATIONS

This application is national stage of PCT Application No PCT/CN2019/098441, filed on Jul. 30, 2019, which claims priority to Chinese Patent Application No. "201811642595.5", filed by BYD Company Limited on Dec. 29, 2018 and entitled "BATTERY TRAY, POWER BATTERY PACK, AND VEHICLE", which are incorporated by reference in this application in their entireties.

FIELD

The present disclosure relates to the field of electric vehicles, and specifically, to a battery tray and a power battery pack.

BACKGROUND

As an energy storage device, the power battery pack is a core component of hybrid vehicles and electric vehicles. A power battery pack mainly includes several battery cells, a battery tray, and a cover plate. The battery tray is mounted at the bottom of the vehicle. The cover plate is sealedly connected to the battery tray to jointly form an enclosed space for accommodating the several battery cells. In order to prevent explosion accidents, the battery cell is generally provided with an anti-explosion valve structure. During use of the battery, if gas pressure inside the cell increases to a certain degree, the anti-explosion valve is opened, so that a flame, smoke or gas inside the battery cell will be discharged through the anti-explosion valve. In the prior art, after the anti-explosion valve on the battery cell is opened, the discharged flame, smoke or gas accumulates inside the battery pack, and if not discharged in time, is likely to cause secondary damage to the battery or affect other batteries.

SUMMARY

An objective of the present disclosure is to provide a battery tray. The battery tray can effectively prevent the flame, smoke or gas discharged from the battery cell from accumulating inside the battery pack.

To achieve the above objective, the present disclosure provides a battery tray, including a tray body, where the tray body includes a base plate and a side beam, and the side beam is disposed around the base plate and defines, together with the base plate, an accommodating space for battery cells; and the base plate is formed therein with an air passage, the base plate is provided with several inlet vents and at least one exhaust vent, the inlet vent is configured to introduce a flame, smoke or gas discharged from the battery cell into the air passage, and the exhaust vent is configured to discharge the flame, smoke or gas inside the air passage.

In some embodiments of the present disclosure, the base plate is a hollow structure, and the hollow structure serves as the air passage.

In some embodiments of the present disclosure, the battery tray further includes a battery-pack anti-explosion valve, and the exhaust vent is blocked by the battery-pack anti-explosion valve.

In some embodiments of the present disclosure, the battery tray further includes at least one of a smoke sensor and a gas sensor, and at least one of the smoke sensor and the gas sensor is disposed in the air passage.

The present disclosure further provides a battery tray, including a tray body, where the tray body includes a base plate and a side beam, the side beam is disposed around the base plate and defines, together with the base plate, an accommodating space for battery cells, the side beam and the base plate are each formed therein with an air passage and are in communication with each other, the base plate is provided with several exhaust vents, the side beam is provided with at least one exhaust vent, the inlet vent is configured to introduce a flame, smoke or gas discharged from the battery cell into the air passage, and the exhaust vent is configured to discharge the flame, smoke or gas inside the air passage.

In some embodiments of the present disclosure, both the side beam and the base plate are hollow structures, and the hollow structure serves as the air passage.

In some embodiments of the present disclosure, the battery tray further includes a battery-pack anti-explosion valve, and the exhaust vent is blocked by the battery-pack anti-explosion valve.

In some embodiments of the present disclosure, the battery tray further includes at least one of a smoke sensor and a gas sensor, and at least one of the smoke sensor and the gas sensor is disposed in the air passage.

By means of the above technical solutions, once gas pressure inside a battery cell increases to such a degree that the cell anti-explosion valve on the battery cell is opened, a flame, smoke or gas inside the battery cell will directly enter the air passage of the tray body through the inlet vents on the tray body, so that the flame, smoke or gas does not enter the accommodating space for the battery cells, thereby preventing the flame, smoke or gas from causing secondary damage to the battery or affecting other batteries.

The present disclosure further provides a power battery pack, including several battery cells, a cover plate, and the foregoing battery tray, where the cover plate is sealedly connected to the battery tray to jointly form an enclosed space for accommodating the several battery cells.

In some embodiments of the present disclosure, each of the battery cells has a cell anti-explosion valve, the inlet vents and the cell anti-explosion valves are disposed opposite to each other and correspond one-to-one to each other, so that a flame, smoke or gas discharged from each of the cell anti-explosion valves enters the air passage through the corresponding inlet vent, the power battery pack further includes a gasket, the gasket is disposed between the battery cells and the base plate, the gasket is provided with through holes, the through holes correspond one-to-one to the inlet vents, and the through hole is located between the corresponding inlet vent and cell anti-explosion valve.

Other features and advantages of the present disclosure will be described in detail in the following detailed description part.

BRIEF DESCRIPTION OF THE DRAWINGS

The accompanying drawings are intended to provide further understanding of the present disclosure and constitute a part of this specification. The accompanying drawings and the specific implementations below are used together for explaining the present disclosure rather than constituting a limitation to the present disclosure. In the accompanying drawings.

DESCRIPTIONS OF REFERENCE NUMERALS

Figure 1A:
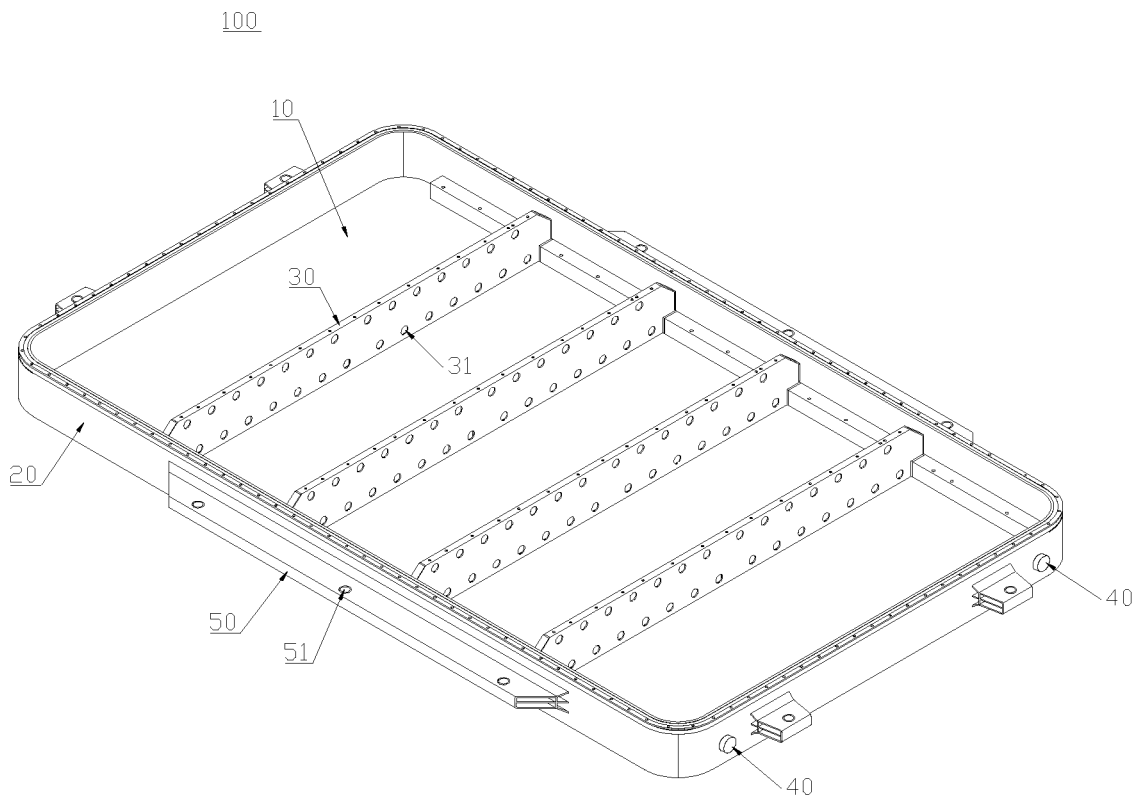
FIG. 1A is a schematic three-dimensional diagram of a battery tray according to an embodiment of the present disclose.

100: battery tray, 10: base plate, 20: side beam, 21: first mounting hole, 30: partition plate, 31: inlet vent, 32: second mounting hole, 40: battery-pack anti-explosion valve, 50: mounting block, 51: third mounting hole, 200: battery cell, 201: cell anti-explosion valve, 300: gasket, 301: through hole.

DETAILED DESCRIPTION

Specific implementations of the present disclosure are described in detail below with reference to the accompanying drawings. It should be understood that the specific implementations described herein are merely used to describe and explain the present disclosure, but are not intended to limit the present disclosure.

As shown in FIG. 1A to FIG. 6, according to one aspect of the present disclosure, a battery tray 100 and a power battery pack having the battery tray 100 are provided. In addition to the battery tray 100, the power battery pack may further include a cover plate (not shown) and several battery cells 200. The cover plate is sealedly connected to the battery tray 100 to jointly form an enclosed space for accommodating the several battery cells 200. Each of the battery cells 200 has a cell anti-explosion valve 201 (referring to FIG. 1D). The battery tray 100 includes a tray body. At least a part of the tray body is formed therein with an air passage. The tray body is provided with several inlet vents 31 and at least one exhaust vent in communication with the air passage. The inlet vents 31 and the cell anti-explosion valves 201 are disposed opposite to each other and correspond one-to-one to each other. Each of the inlet vents 31 is used for introducing a flame, smoke or gas inside the battery cell 200 into the air passage when the corresponding cell anti-explosion valve 201 is opened. The exhaust vent communicates the air passage with space outside the battery pack, and is used for discharging the flame, smoke or gas inside the air passage to the outside of the battery pack. When gas pressure inside the battery cell 200 increases to such a degree that the cell anti-explosion valve 201 on the battery cell is opened, the flame, smoke or gas inside the battery cell 200 is discharged to the outside of the battery cell 200 through the cell anti-explosion valve 201, and then rushes to the inlet vent 31 and enters the air passage.

By means of the above technical solutions, once gas pressure inside a battery cell 200 increases to such a degree that the cell anti-explosion valve 201 on the battery cell is opened, a flame, smoke or gas inside the battery cell 200 will directly enter the air passage of the tray body through the inlet vents 31 on the tray body, so that the flame, smoke or gas does not enter the accommodating space inside the tray for the battery cells 200, thereby preventing the flame, smoke or gas from causing secondary damage to the battery or affecting other batteries.

To prevent the flame, smoke or gas discharged from the cell anti-explosion valve 201 from leaking into the battery accommodating space, as shown in FIG. 1C, FIG. 1D, FIG. 2B, FIG. 2C, and FIG. 3D, the power battery pack further includes a gasket 300. The gasket 300 is disposed between the battery cells 200 and the tray body, is flame retardant and has certain compressibility. The gasket 300 is provided with several through holes 301. The through holes 301 correspond one-to-one to the inlet vents 31 on the tray body. Each of the through holes 301 is located between the corresponding inlet vent 31 and cell anti-explosion valve 201. Under the compression of the battery cells 200 and the tray body, the gasket 300 forms a seal around the inlet vents 31, to prevent the flame, smoke or gas from leaking into the battery accommodating space.

To prevent external dust and water from entering the battery accommodating space through the exhaust vent and the air passage, as shown in FIG. 1A, FIG. 1B, FIG. 2A to FIG. 2E, FIG. 3A to FIG. 3C, FIG. 4C, FIG. 5, and FIG. 6, the battery tray 100 further includes a battery-pack anti-explosion valve 40. The battery-pack anti-explosion valve 40 is mounted on the exhaust vent, so that the exhaust vent is blocked by the battery-pack anti-explosion valve 40. The flame, smoke or gas discharged from the cell anti-explosion valve 201 enters and accumulates in the air passage through the inlet vents 31, and when gas pressure inside the air passage reaches a certain value, the battery-pack anti-explosion valve 40 is opened, to discharge the flame, smoke or gas that accumulates in the air passage. Herein, the battery-pack anti-explosion valve 40 and the cell anti-explosion valve 201 are all well known to a person skilled in the art, and therefore their structures and working principles will not be described in detail herein.

In the present disclosure, the battery tray 100 may have any suitable structure, which is not limited in the present disclosure. Several embodiments of the battery tray 100 will be described in detail below. It should be understood that these embodiments are merely used for illustrating and explaining the present disclosure, and are not intended to limit the present disclosure.

In a first embodiment, as shown in FIG. 1A to FIG. 1D, the tray body includes a base plate 10, a side beam 20, and several partition plates 30. The side beam 20 is disposed around the base plate 10 and defines, together with the base plate 10, the battery accommodating space. The partition plates 30 are disposed on the base plate 10. The partition plates 30 divide the base plate 10 into several regions for placing the battery cells 200. The partition plates 30 and the side beam 20 are each formed therein with an air passage and are in communication with each other. The inlet vents 31 are provided on the partition plates 30. The at least one exhaust vent is provided on the side beam 20. In this embodiment, the flame, smoke or gas discharged from the cell anti-explosion valve 201 enters the air passages in the partition plates 30 through the inlet vents 31 on the partition plates 30, and then diffuses into the air passage in the side beam 20 from the air passages in the partition plates 30. When gas pressure inside the air passage reaches a certain value, the battery-pack anti-explosion valve 40 on the side beam 20 is opened, so that the flame, smoke or gas that accumulates in the air passage is discharged to the outside of the battery pack through the battery-pack anti-explosion valve 40.

Figure 1B:
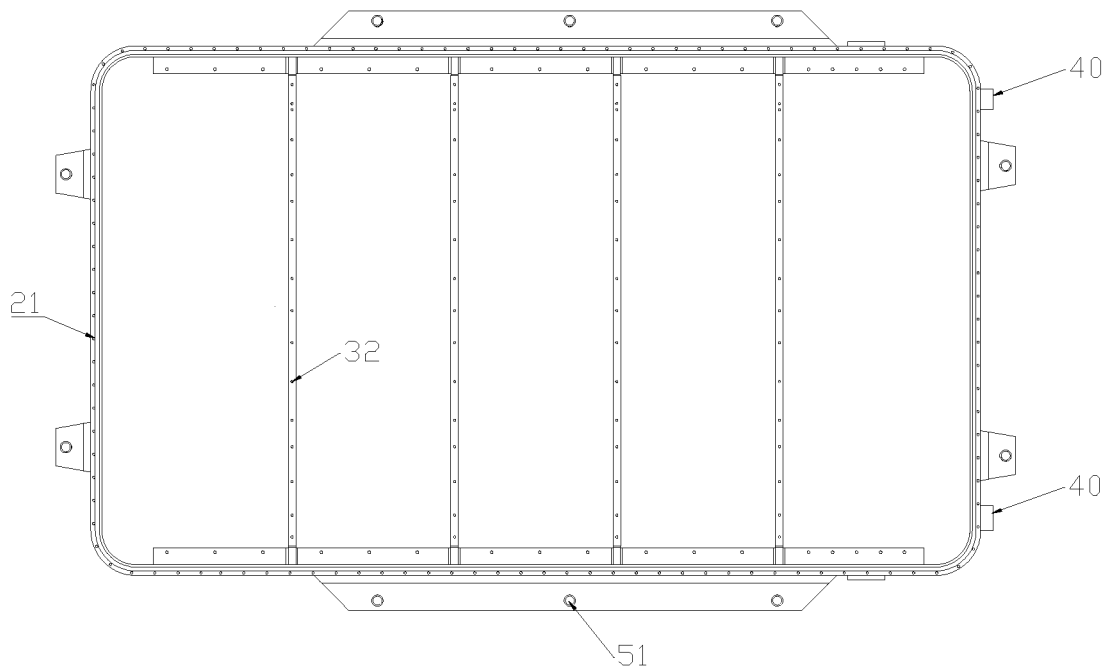
FIG. 1B is a top view of the battery tray in FIG. 1A.
Figure 1C:
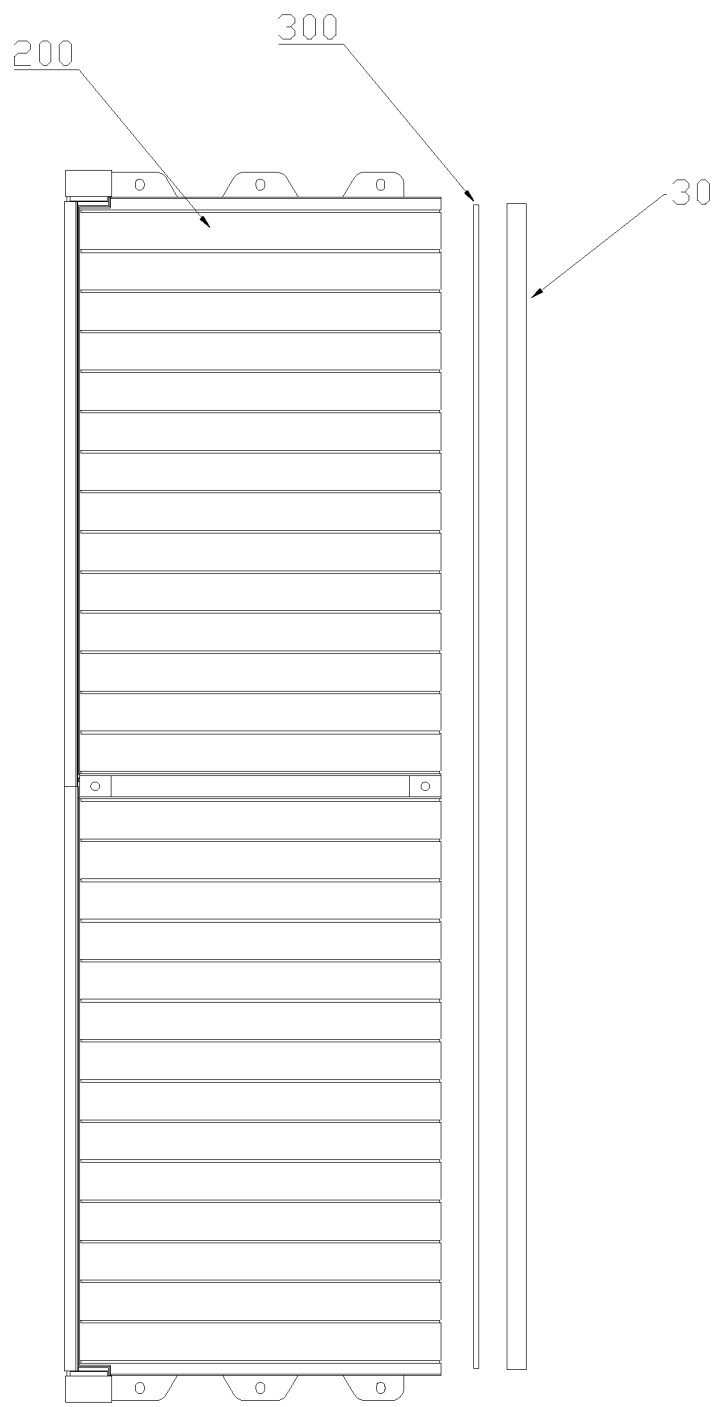
FIG. 1C is a top exploded view of a battery module, a gasket, and a partition plate in the battery tray in FIG. 1A.
Figure 1D:
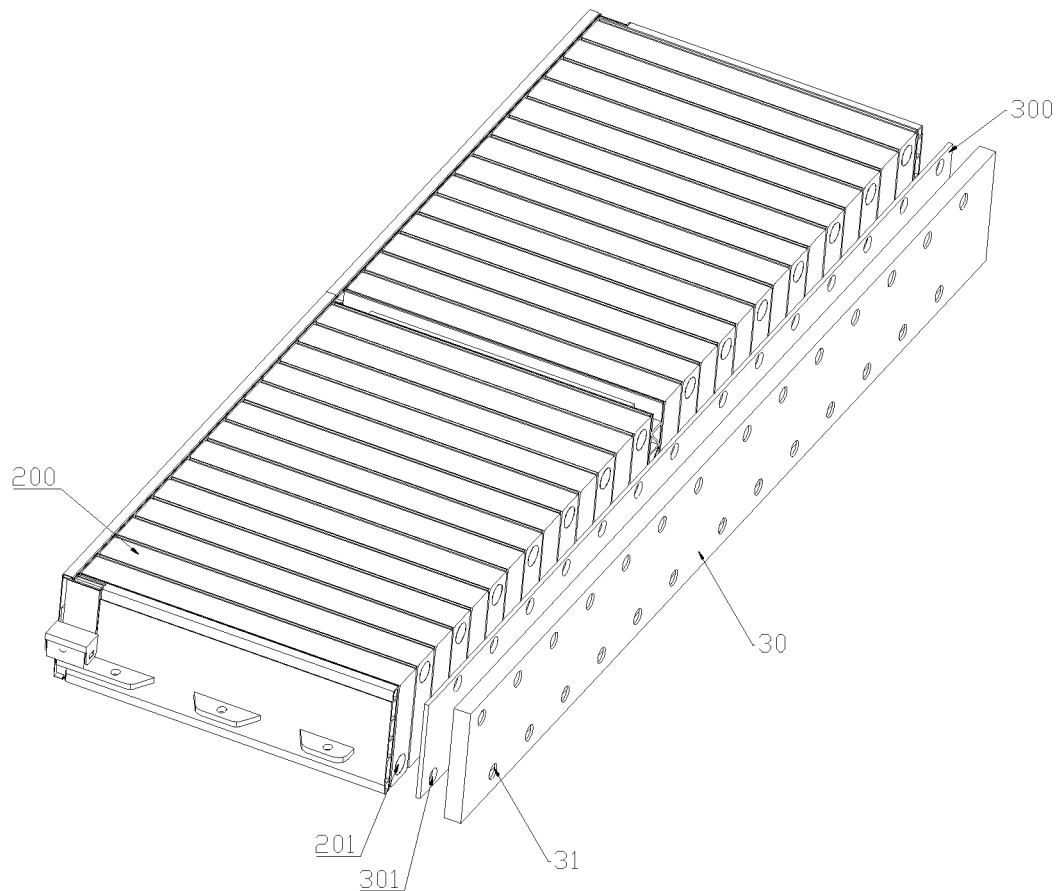
FIG. 1D is a three-dimensional exploded view of a battery module, a gasket, and a partition plate in the battery tray in FIG. 1A.

In the first embodiment, as shown in FIG. 1C and FIG. 1D, a plurality of battery cells 200 form a battery module. Gaskets 300 are disposed between the battery module and the partition plates 30. Each of the gaskets 300 is provided with several through holes 301. The through holes 301 correspond one-to-one to the inlet vents 31 on the partition plates 30. Each of the through holes 301 is located between the corresponding inlet vent 31 and cell anti-explosion valve 201.

Figure 4A:
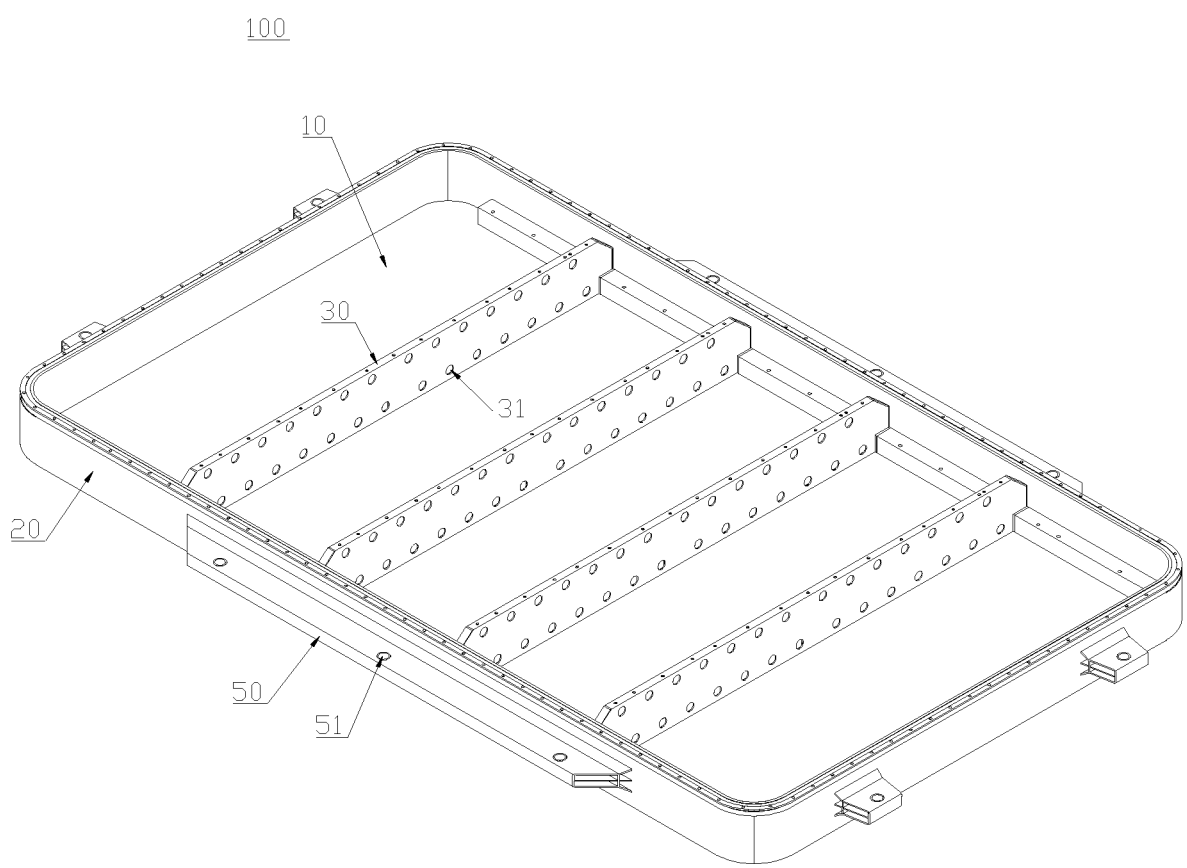
FIG. 4A is a schematic three-dimensional diagram of a battery tray according to another embodiment of the present disclose.
Figure 4B:
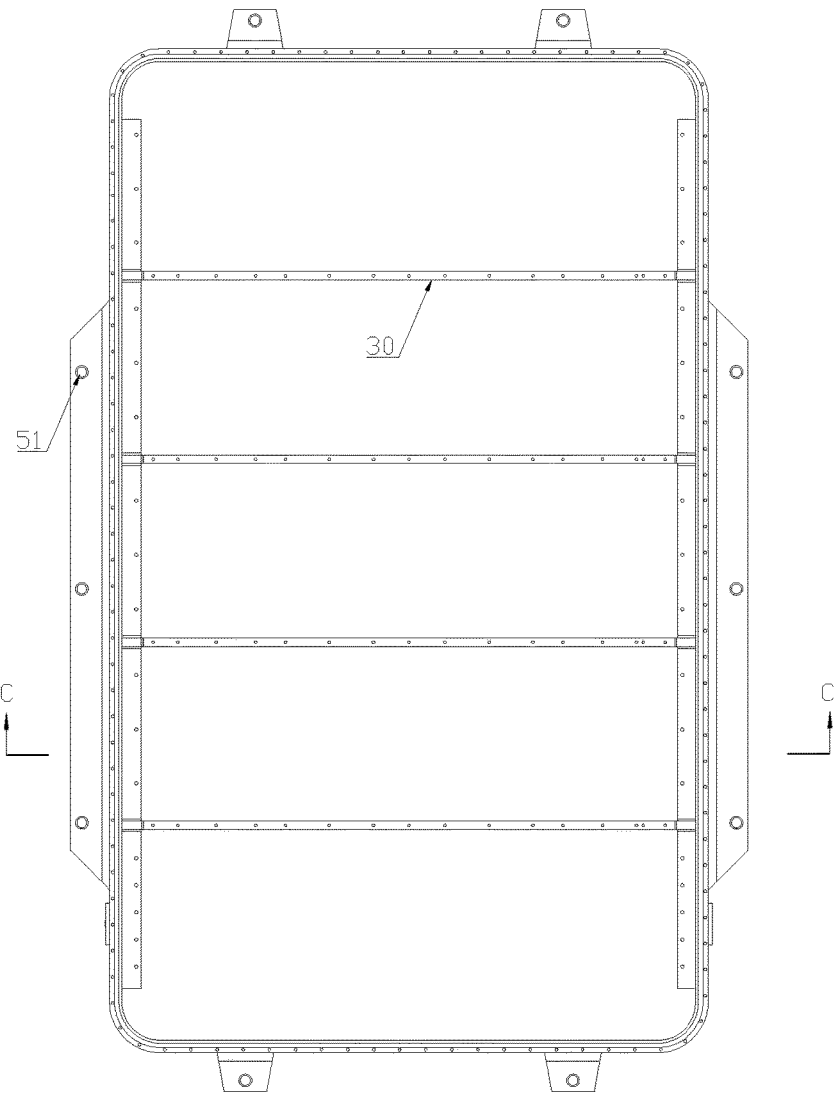
FIG. 4B is a schematic top view of the battery tray in FIG. 4A.
Figure 4C:
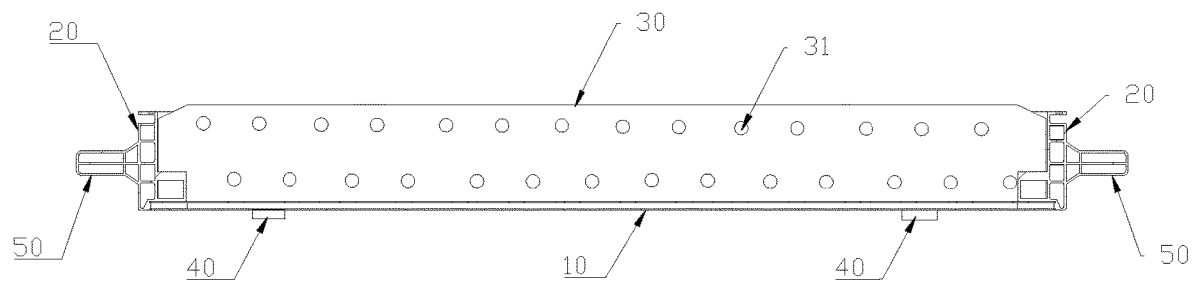
FIG. 4C is a cross-sectional view taken along line C-C in FIG. 4C.

In a second embodiment, as shown in FIG. 4A to FIG. 4C, the tray body includes a base plate 10, a side beam 20, and several partition plates 30. The side beam 20 is disposed around the base plate 10 and defines, together with the base plate 10, the battery accommodating space. The partition plates 30 are disposed on the base plate 10. The partition plates 30 divide the base plate 10 into several regions for placing the battery cells 200. The partition plates 30 and the base plate 10 are each formed therein with an air passage and are in communication with each other. The inlet vents 31 are provided on the partition plates 30. The at least one exhaust vent is disposed on the base plate 10. In this embodiment, the flame, smoke or gas discharged from the cell anti-explosion valve 201 enters the air passages in the partition plates 30 through the inlet vents 31 on the partition plates 30, and then diffuses into the air passage in the base plate 10 from the air passages in the partition plates 30. When gas pressure inside the air passage reaches a certain value, the battery-pack anti-explosion valve 40 on the base plate 10 is opened, so that the flame, smoke or gas that accumulates in the air passage is discharged to the outside of the battery pack through the battery-pack anti-explosion valve 40.

Because the top of the battery pack faces toward the passenger cabin, in the second embodiment, the exhaust vent provided on the base plate 10 allows the gas inside the air passage to be discharged downward, which is safer.

In a third embodiment, the tray body includes a base plate 10, a side beam 20, and several partition plates 30. The side beam 20 is disposed around the base plate 10 and defines, together with the base plate 10, the battery accommodating space. The partition plates 30 are disposed on the base plate 10. The partition plates 30 divide the base plate 10 into several regions for placing the battery cells 200. The partition plates 30 and the side beam 20 are each formed therein with an air passage and are in communication with each other. A part of the inlet vents 31 are provided on the partition plates 30, and the other part of the inlet vents 31 are provided on the side beam 20. The at least one exhaust vent is provided on the side beam 20. In this embodiment, the flame, smoke or gas discharged from the cell anti-explosion valve 201 enters at least one of the air passages in the partition plates 30 through the inlet vents 31 on the partition plates 30 and the air passage in the side beam 20 through the inlet vents 31 on the side beam 20. When gas pressure inside the air passage reaches a certain value, the battery-pack anti-explosion valve 40 on the side beam 20 is opened, so that the flame, smoke or gas that accumulates in the air passage is discharged to the outside of the battery pack through the battery-pack anti-explosion valve 40.

In a fourth embodiment, the tray body includes a base plate 10, a side beam 20, and several partition plates 30. The side beam 20 is disposed around the base plate 10 and defines, together with the base plate 10, the battery accommodating space. The partition plates 30 are disposed on the base plate 10. The partition plates 30 divide the base plate 10 into several regions for placing the battery cells 200. The partition plates 30 and the base plate 10 are each formed therein with an air passage and are in communication with each other. A part of the inlet vents 31 are provided on the partition plates 30, and the other part of the inlet vents 31 are provided on the base plate 10. The at least one exhaust vent is disposed on the base plate 10. In this embodiment, the flame, smoke or gas discharged from the cell anti-explosion valve 201 enters at least one of the air passages in the partition plates 30 through the inlet vents 31 on the partition plates 30 and the air passage in the base plate 10 through the inlet vents 31 on the base plate 10. When gas pressure inside the air passage reaches a certain value, the battery-pack anti-explosion valve 40 on the base plate 10 is opened, so that the flame, smoke or gas that accumulates in the air passage is discharged to the outside of the battery pack through the battery-pack anti-explosion valve 40.

Because the top of the battery pack faces toward the passenger cabin, in the fourth embodiment, the exhaust vent provided on the base plate 10 allows the gas inside the air passage to be discharged downward, which is safer.

In a fifth embodiment, the tray body includes a base plate 10, a side beam 20, and several partition plates 30. The side beam 20 is disposed around the base plate 10 and defines, together with the base plate 10, the battery accommodating space. The partition plates 30 are disposed on the base plate 10. The partition plates 30 divide the base plate 10 into several regions for placing the battery cells 200. The partition plates 30, the side beam 20, and the base plate 10 are each formed therein with an air passage and are in communication with each other. A part of the inlet vents 31 are provided on the partition plates 30, a part of the inlet vents 31 are provided on the side beam 20, and the remaining part of the inlet vents 31 are provided on the base plate 10. The at least one exhaust vent is provided on the side beam 20. In this embodiment, the flame, smoke or gas discharged from the cell anti-explosion valve 201 enters at least one of the air passages in the partition plates 30 through the inlet vents 31 on the partition plates 30, the air passage in the base plate 10 through the inlet vents 31 on the base plate 10, and the air passage in the side beam 20 through the inlet vents 31 on the side beam 20. When gas pressure inside the air passage reaches a certain value, the battery-pack anti-explosion valve 40 on the side beam 20 is opened, so that the flame, smoke or gas that accumulates in the air passage is discharged to the outside of the battery pack through the battery-pack anti-explosion valve 40.

In a sixth embodiment, the tray body includes a base plate 10, a side beam 20, and several partition plates 30. The side beam 20 is disposed around the base plate 10 and defines, together with the base plate 10, the battery accommodating space. The partition plates 30 are disposed on the base plate 10. The partition plates 30 divide the base plate 10 into several regions for placing the battery cells 200. The partition plates 30, the side beam 20, and the base plate 10 are each formed therein with an air passage and are in communication with each other. A part of the inlet vents 31 are provided on the partition plates 30, a part of the inlet vents 31 are provided on the side beam 20, and the remaining part of the inlet vents 31 are provided on the base plate 10. The at least one exhaust vent is disposed on the base plate 10. In this embodiment, the flame, smoke or gas discharged from the cell anti-explosion valve 201 enters at least one of the air passages in the partition plates 30 through the inlet vents 31 on the partition plates 30, the air passage in the base plate 10 through the inlet vents 31 on the base plate 10, and the air passage in the side beam 20 through the inlet vents 31 on the side beam 20. When gas pressure inside the air passage reaches a certain value, the battery-pack anti-explosion valve 40 on the base plate 10 is opened, so that the flame, smoke or gas that accumulates in the air passage is discharged to the outside of the battery pack through the battery-pack anti-explosion valve 40.

Because the top of the battery pack faces toward the passenger cabin, in the sixth embodiment, the exhaust vent provided on the base plate 10 allows the gas inside the air passage to be discharged downward, which is safer.

In a seventh embodiment, the tray body includes a base plate 10, a side beam 20, and several partition plates 30. The side beam 20 is disposed around the base plate 10 and defines, together with the base plate 10, the battery accommodating space. The partition plates 30 are disposed on the base plate 10. The partition plates 30 divide the base plate 10 into several regions for placing the battery cells 200. The partition plates 30, the side beam 20, and the base plate 10 are each formed therein with an air passage and are in communication with each other. A part of the inlet vents 31 are provided on the partition plates 30, a part of the inlet vents 31 are provided on the side beam 20, and the remaining part of the inlet vents 31 are provided on the base plate 10. A part of the exhaust vents are provided on the side beam 20, and the other part of the exhaust vents are provided on the base plate 10. In this embodiment, the flame, smoke or gas discharged from the cell anti-explosion valve 201 enters at least one of the air passages in the partition plates 30 through the inlet vents 31 on the partition plates 30, the air passage in the base plate 10 through the inlet vents 31 on the base plate 10, and the air passage in the side beam 20 through the inlet vents 31 on the side beam 20. When gas pressure inside the air passage reaches a certain value, the battery-pack anti-explosion valve 40 on at least one of the base plate 10 and the side beam 20 is opened, or the battery-pack anti-explosion valve 40 on the side beam 20 is opened, or the battery-pack anti-explosion valves 40 on both the base plate 10 and the side beam 20 are opened, so that the flame, smoke or gas that accumulates in the air passage is discharged to the outside of the battery pack through the battery-pack anti-explosion valve 40.

In an eighth embodiment, the tray body includes a base plate 10, a side beam 20, and several partition plates 30. The side beam 20 is disposed around the base plate 10 and defines, together with the base plate 10, the battery accommodating space. The partition plates 30 are disposed on the base plate 10. The partition plates 30 divide the base plate 10 into several regions for placing the battery cells 200. The partition plates 30, the side beam 20, and the base plate 10 are each formed therein with an air passage and are in communication with each other. The inlet vents 31 are provided on the partition plates 30. A part of the exhaust vents are provided on the side beam 20, and the other part of the exhaust vents are provided on the base plate 10. In this embodiment, the flame, smoke or gas discharged from the cell anti-explosion valve 201 enters the air passages in the partition plates 30 through the inlet vents 31 on the partition plates 30. When gas pressure inside the air passage reaches a certain value, the battery-pack anti-explosion valve 40 on at least one of the base plate 10 and the side beam 20 is opened, or the battery-pack anti-explosion valve 40 on the side beam 20 is opened, or the battery-pack anti-explosion valves 40 on both the base plate 10 and the side beam 20 are opened, so that the flame, smoke or gas that accumulates in the air passage is discharged to the outside of the battery pack through the battery-pack anti-explosion valve 40.

In a ninth embodiment, the tray body includes a base plate 10, a side beam 20, and several partition plates 30. The side beam 20 is disposed around the base plate 10 and defines, together with the base plate 10, the battery accommodating space. The partition plates 30 are disposed on the base plate 10. The partition plates 30 divide the base plate 10 into several regions for placing the battery cells 200. The partition plates 30, the side beam 20, and the base plate 10 are each formed therein with an air passage and are in communication with each other. A part of the inlet vents 31 are provided on the partition plates 30, and the other part of the inlet vents 31 are provided on the side beam 20. A part of the exhaust vents are provided on the side beam 20, and the other part of the exhaust vents are provided on the base plate 10. In this embodiment, the flame, smoke or gas discharged from the cell anti-explosion valve 201 enters at least one of the air passages in the partition plates 30 through the inlet vents 31 on the partition plates 30 and the air passage in the side beam 20 through the inlet vents 31 on the side beam 20. When gas pressure inside the air passage reaches a certain value, the battery-pack anti-explosion valve 40 on at least one of the base plate 10 and the side beam 20 is opened, or the battery-pack anti-explosion valve 40 on the side beam 20 is opened, or the battery-pack anti-explosion valves 40 on both the base plate 10 and the side beam 20 are opened, so that the flame, smoke or gas that accumulates in the air passage is discharged to the outside of the battery pack through the battery-pack anti-explosion valve 40.

In a tenth embodiment, the tray body includes a base plate 10, a side beam 20, and several partition plates 30. The side beam 20 is disposed around the base plate 10 and defines, together with the base plate 10, the battery accommodating space. The partition plates 30 are disposed on the base plate 10. The partition plates 30 divide the base plate 10 into several regions for placing the battery cells 200. The partition plates 30, the side beam 20, and the base plate 10 are each formed therein with an air passage and are in communication with each other. A part of the inlet vents 31 are provided on the partition plates 30, and the other part of the inlet vents 31 are provided on the base plate 10. A part of the exhaust vents are provided on the side beam 20, and the other part of the exhaust vents are provided on the base plate 10. In this embodiment, the flame, smoke or gas discharged from the cell anti-explosion valve 201 enters at least one of the air passages in the partition plates 30 through the inlet vents 31 on the partition plates 30 and the air passage in the base plate 10 through the inlet vents 31 on the base plate 10. When gas pressure inside the air passage reaches a certain value, the battery-pack anti-explosion valve 40 on at least one of the base plate 10 and the side beam 20 is opened, or the battery-pack anti-explosion valve 40 on the side beam 20 is opened, or the battery-pack anti-explosion valves 40 on both the base plate 10 and the side beam 20 are opened, so that the flame, smoke or gas that accumulates in the air passage is discharged to the outside of the battery pack through the battery-pack anti-explosion valve 40.

In an eleventh embodiment, the tray body includes a base plate 10, a side beam 20, and several partition plates 30. The side beam 20 is disposed around the base plate 10 and defines, together with the base plate 10, the battery accommodating space. The partition plates 30 are disposed on the base plate 10. The partition plates 30 divide the base plate 10 into several regions for placing the battery cells 200. The partition plates 30, the side beam 20, and the base plate 10 are each formed therein with an air passage. The air passages in the partition plates 30 are in communication with the air passage in the side beam 20. The air passage in the side beam 20 is in communication with the air passage in the base plate 10. The air passages in the partition plates 30 are in communication with the air passage in the base plate 10 through the air passage in the side beam 20. The inlet vents 31 are provided on the partition plates 30. The at least one exhaust vent is disposed on the base plate 10. In this embodiment, the flame, smoke or gas discharged from the cell anti-explosion valve 201 enters the air passages in the partition plates 30 through the inlet vents 31 on the partition plates 30, diffuses into the air passage in the side beam 20 from the air passages in the partition plates 30, and then diffuses into the air passage in the base plate 10 from the air passage in the side beam 20. When gas pressure inside the air passage reaches a certain value, the battery-pack anti-explosion valve 40 on the base plate 10 is opened, so that the flame, smoke or gas that accumulates in the air passage is discharged to the outside of the battery pack through the battery-pack anti-explosion valve 40.

In a twelfth embodiment, the tray body includes a base plate 10, a side beam 20, and several partition plates 30. The side beam 20 is disposed around the base plate 10 and defines, together with the base plate 10, the battery accommodating space. The partition plates 30 are disposed on the base plate 10. The partition plates 30 divide the base plate 10 into several regions for placing the battery cells 200. The partition plates 30, the side beam 20, and the base plate 10 are each formed therein with an air passage. The air passages in the partition plates 30 are in communication with the air passage in the base plate 10. The air passage in the base plate 10 is in communication with the air passage in the side beam 20. The air passages in the partition plates 30 are in communication with the air passage in the side beam 10 through the air passage in the base plate 20. The inlet vents 31 are provided on the partition plates 30. The at least one exhaust vent is provided on the side beam 20. In this embodiment, the flame, smoke or gas discharged from the cell anti-explosion valve 201 enters the air passages in the partition plates 30 through the inlet vents 31 on the partition plates 30, diffuses into the air passage in the base plate 10 from the air passages in the partition plates 30, and then diffuses into the air passage in the side beam 20 from the air passage in the base plate 10. When gas pressure inside the air passage reaches a certain value, the battery-pack anti-explosion valve 40 on the side beam 20 is opened, so that the flame, smoke or gas that accumulates in the air passage is discharged to the outside of the battery pack through the battery-pack anti-explosion valve 40.

In a thirteenth embodiment, as shown in FIG. 3A to FIG. 3D, the tray body includes a base plate 10 and a side beam 20. The side beam 20 is disposed around the base plate 10 and defines, together with the base plate 10, the battery accommodating space. The side beam 20 is formed therein with an air passage. The inlet vents 31 and the at least one exhaust vent are all provided on the side beam 20. In this embodiment, because the air passage is formed in the side beam 20, the flame, smoke or gas discharged from the cell anti-explosion valve 201 enters the air passage in the side beam 20 through the inlet vents 31 on the side beam 20. When gas pressure inside the air passage reaches a certain value, the battery-pack anti-explosion valve 40 on the side beam 20 is opened, so that the flame, smoke or gas that accumulates in the air passage is discharged to the outside of the battery pack through the battery-pack anti-explosion valve 40.

Figure 3A:
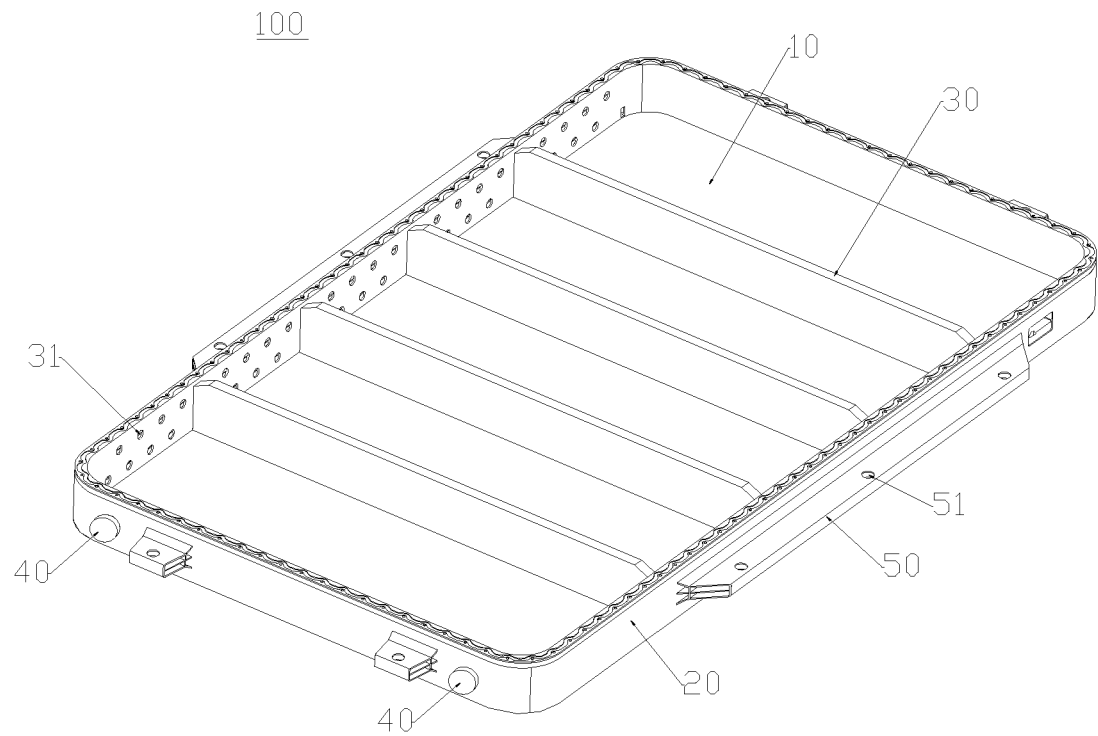
FIG. 3A is a schematic three-dimensional diagram of a battery tray according to another embodiment of the present disclose.
Figure 3B:
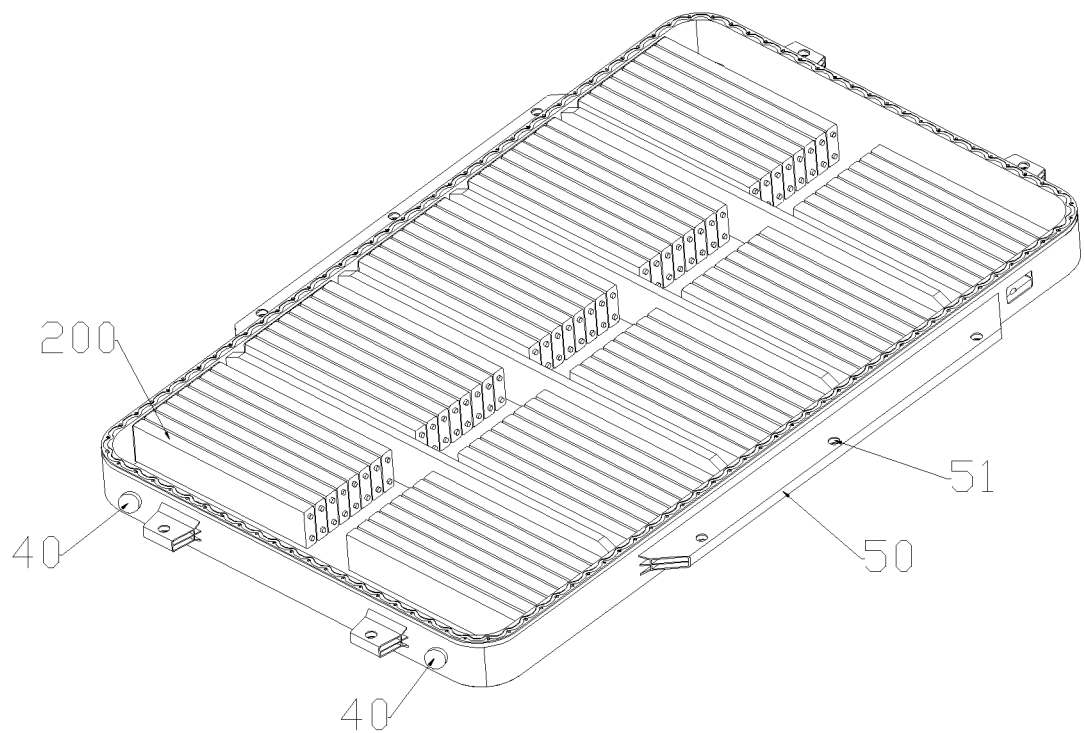
FIG. 3B is a three-dimensional assembled view of the battery tray in FIG. 3A and battery cells.
Figure 3C:
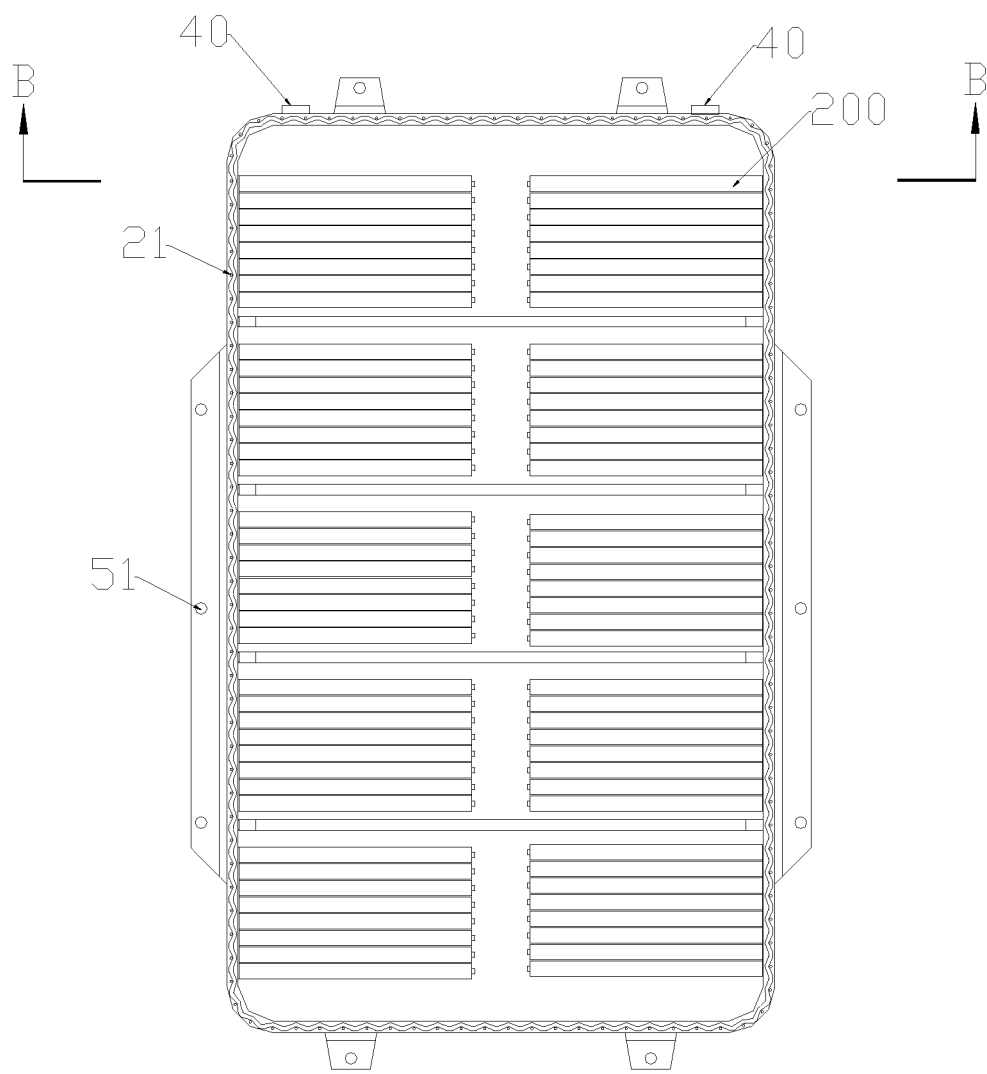
FIG. 3C is a schematic top view of the battery tray in FIG. 3A and battery cells.
Figure 3D:
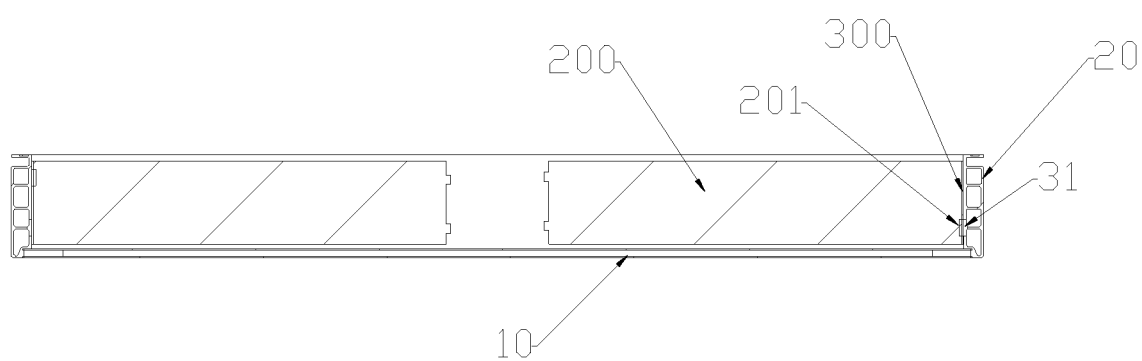
FIG. 3D is a cross-sectional view taken along line B-B in FIG. 3C.

In the thirteenth embodiment, as shown in FIG. 3D, a plurality of battery cells 200 form a battery module. Gaskets 300 are disposed between the battery module and the side beam 20. Each of the gaskets 300 is provided with several through holes 301. The through holes 301 correspond one-to-one to the inlet vents 31 on the side beam 20. Each of the through holes 301 is located between the corresponding inlet vent 31 and cell anti-explosion valve 201.

When a battery cell 200 undergoes a thermal runaway, generally dozens of liters or even hundreds of liters of smoke or gas are generated in a short period of time. In the tenth embodiment, the configuration of both the inlet vents 31 and the at least one exhaust vent on the side beam 20 allows for a shorter gas discharge path, so that the smoke or gas can be discharged more quickly, thereby improving the safety performance of the battery pack.

In a fourteenth embodiment, as shown in FIG. 2A to FIG. 2F, the tray body includes a base plate 10 and a side beam 20. The side beam 20 is disposed around the base plate 10 and defines, together with the base plate 10, the battery accommodating space. The base plate 10 is formed therein with an air passage. The inlet vents 31 and the at least one exhaust vent are all provided on the base plate 10. In this embodiment, because the air passage is formed in the base plate 10, the flame, smoke or gas discharged from the cell anti-explosion valve 201 enters the air passage in the base plate 10 through the inlet vents 31 on the base plate 10. When gas pressure inside the air passage reaches a certain value, the battery-pack anti-explosion valve 40 on the base plate 10 is opened, so that the flame, smoke or gas that accumulates in the air passage is discharged to the outside of the battery pack through the battery-pack anti-explosion valve 40.

Figure 2A:
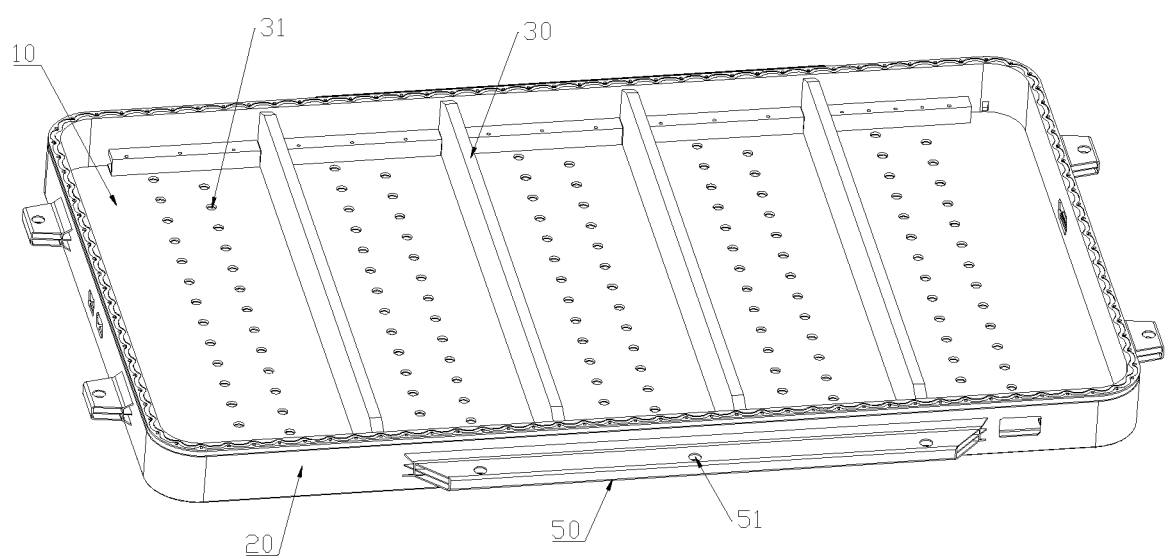
FIG. 2A is a schematic three-dimensional diagram of a battery tray according to another embodiment of the present disclose.
Figure 2B:
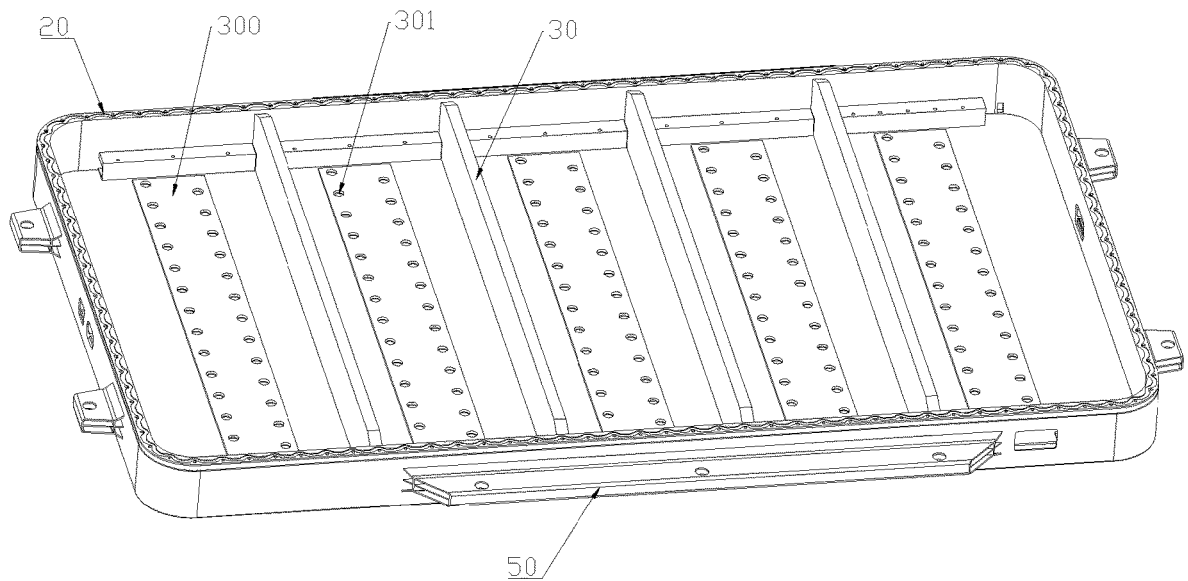
FIG. 2B is a schematic three-dimensional diagram of the battery tray in FIG. 2A, where a gasket is also shown.
Figure 2C:
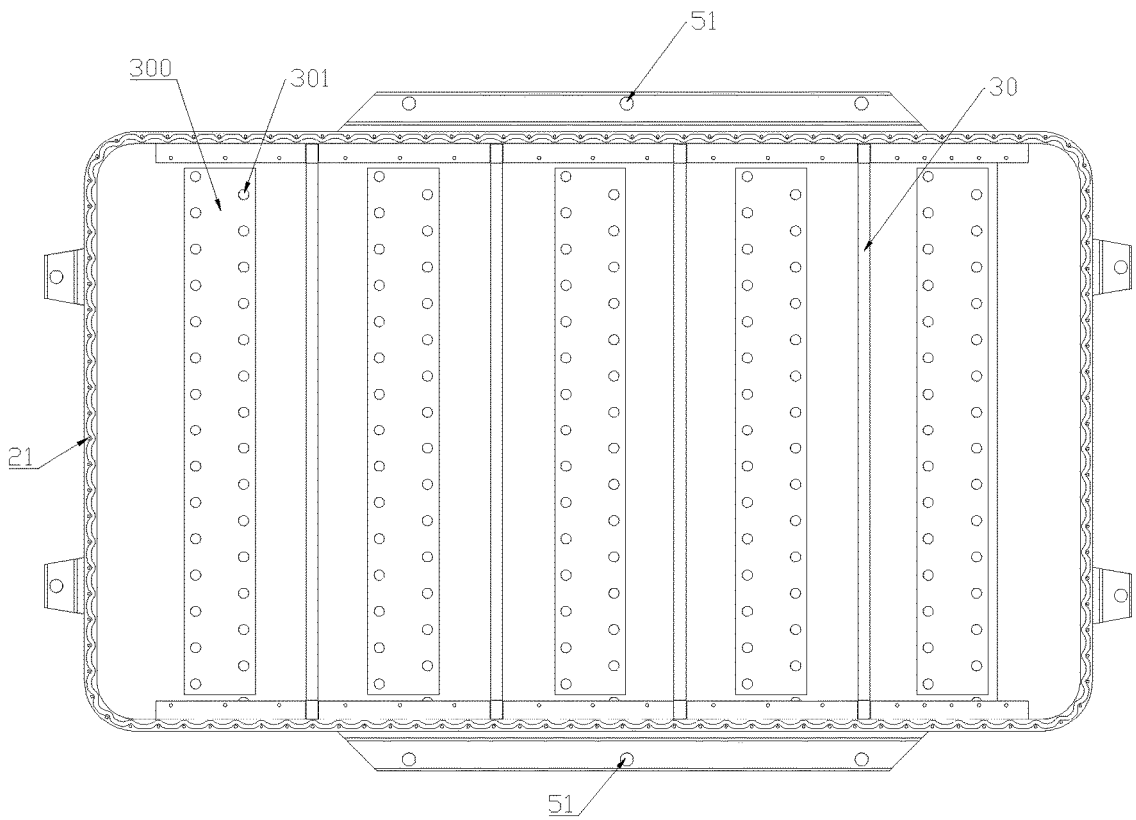
FIG. 2C is a schematic top view of the battery tray in FIG. 2A, where a gasket is also shown.
Figure 2D:
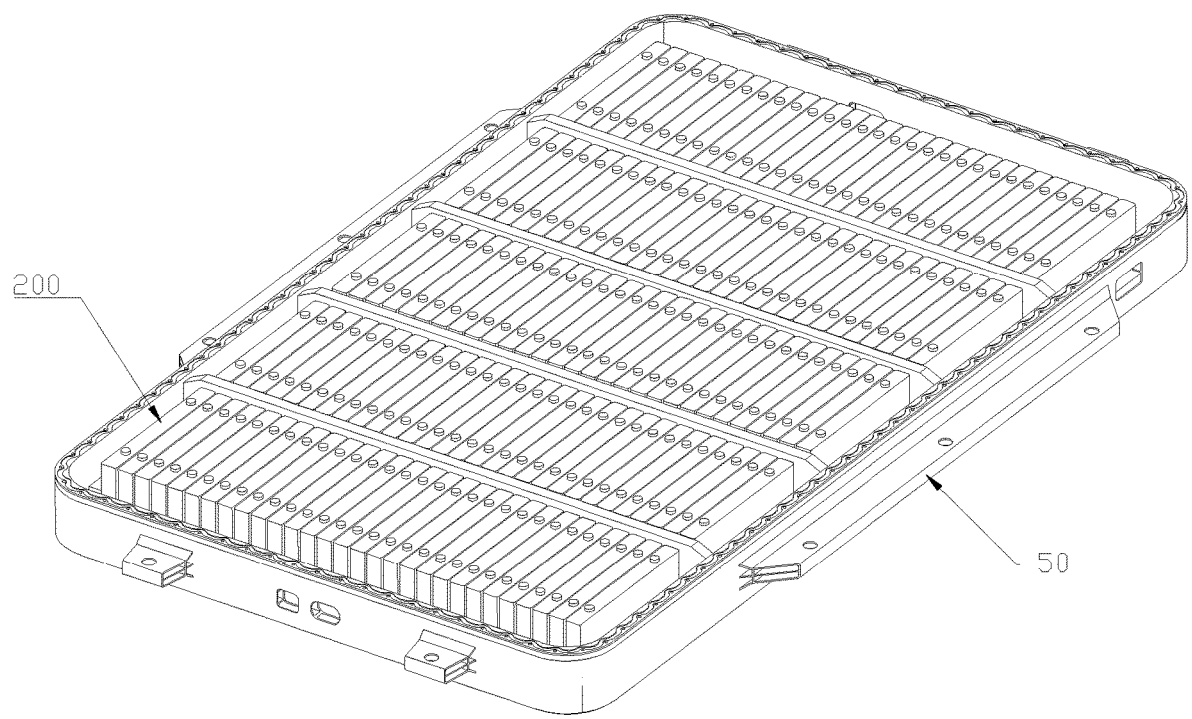
FIG. 2D is a three-dimensional assembled view of the battery tray in FIG. 2A and battery cells.
Figure 2E:
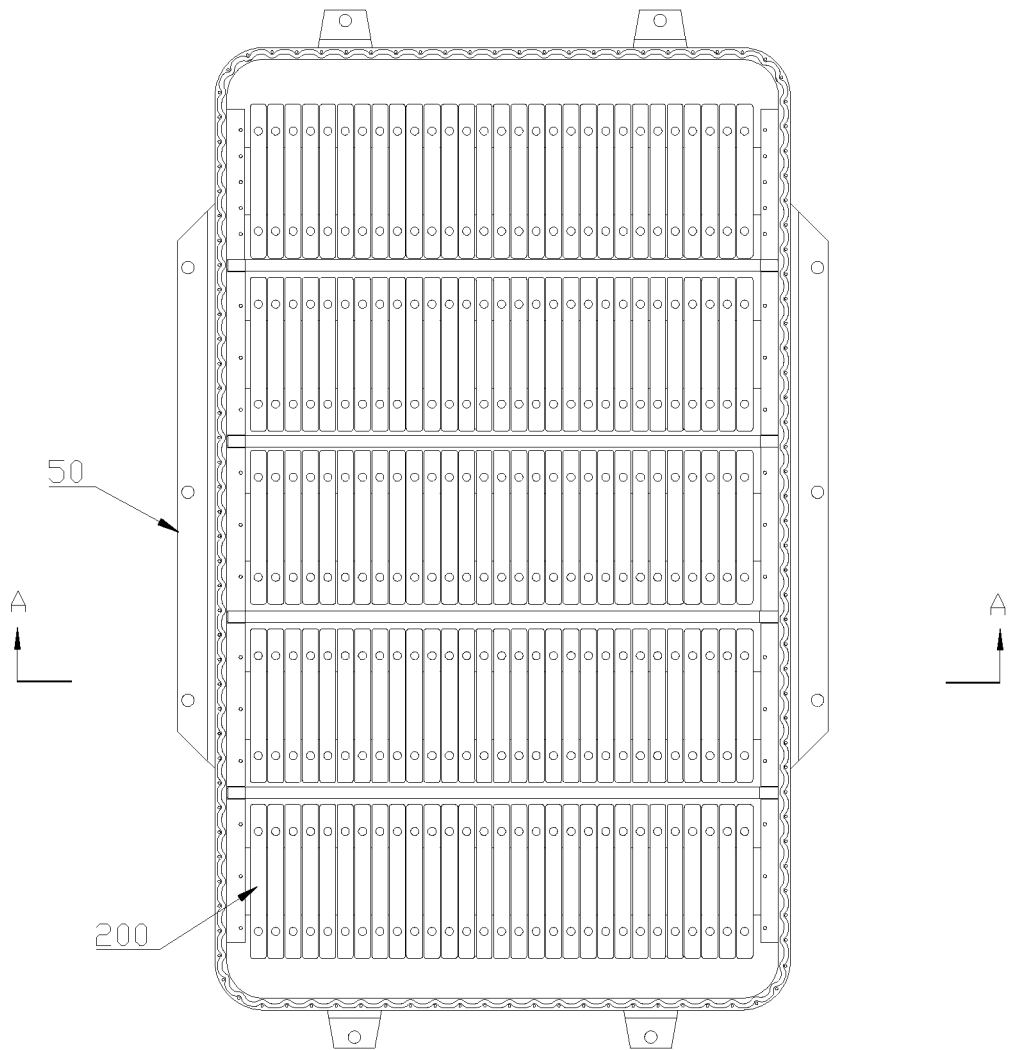
FIG. 2E is a top assembled view of the battery tray in FIG. 2A and battery cells.
Figure 2F:
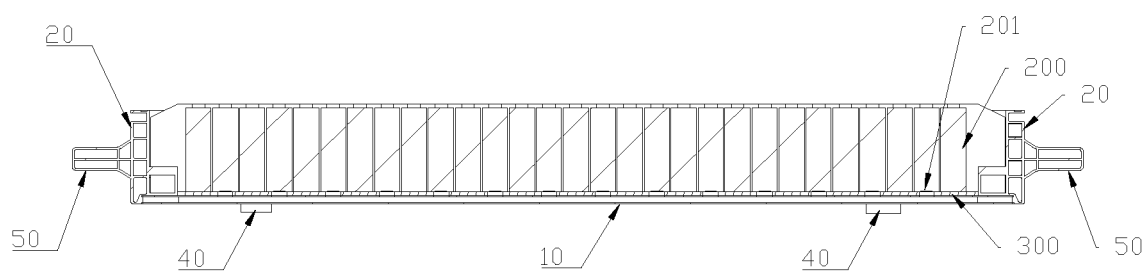
FIG. 2F is a cross-sectional view taken along line A-A in FIG. 2E.

In the fourteenth embodiment, as shown in FIG. 2B and FIG. 2C, a plurality of battery cells 200 form a battery module. Gaskets 300 are disposed between the battery module and the side beam 20. Each of the gaskets 300 is provided with several through holes 301. The through holes 301 correspond one-to-one to the inlet vents 31 on the base plate 10. Each of the through holes 301 is located between the corresponding inlet vent 31 and cell anti-explosion valve 201.

When a battery cell 200 undergoes a thermal runaway, generally dozens of liters or even hundreds of liters of smoke or gas are generated in a short period of time. In the fourteenth embodiment, the configuration of both the inlet vents 31 and the at least one exhaust vent on the base plate 10 allows for a shorter gas discharge path, so that the smoke or gas can be discharged more quickly, thereby improving the safety performance of the battery pack.

Because the top of the battery pack faces toward the passenger cabin, in the fourteenth embodiment, the exhaust vent provided on the base plate 10 allows the gas inside the air passage to be discharged downward, which is safer.

Figure 5:
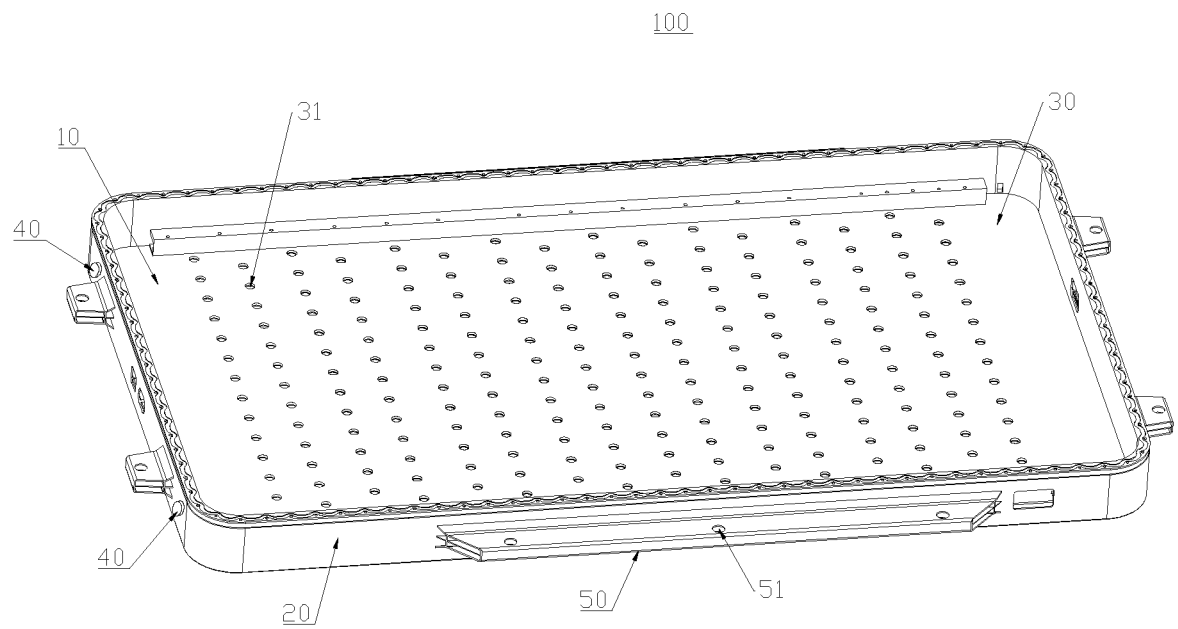
FIG. 5 is a schematic three-dimensional diagram of a battery tray according to another embodiment of the present disclose.

In a fifteenth embodiment, as shown in FIG. 5, the tray body includes a base plate 10 and a side beam 20. The side beam 20 is disposed around the base plate 10 and defines, together with the base plate 10, the battery accommodating space. The side beam 20 and the base plate 10 are each formed therein with an air passage and are in communication with each other. The inlet vents 31 are provided on the base plate 10. The at least one exhaust vent is provided on the side beam 20. In this embodiment, the flame, smoke or gas discharged from the cell anti-explosion valve 201 enters the air passage in the base plate 10 through the inlet vents 31 on the base plate 10, and then diffuses into the air passage in the side beam 20 from the air passage in the base plate 10. When gas pressure inside the air passage reaches a certain value, the battery-pack anti-explosion valve 40 on the side beam 20 is opened, so that the flame, smoke or gas that accumulates in the air passage is discharged to the outside of the battery pack through the battery-pack anti-explosion valve 40.

In a sixteenth embodiment, the tray body includes a base plate 10 and a side beam 20. The side beam 20 is disposed around the base plate 10 and defines, together with the base plate 10, the battery accommodating space. The side beam 20 and the base plate 10 are each formed therein with an air passage and are in communication with each other. The inlet vents 31 are provided on the side beam 20. The at least one exhaust vent is disposed on the base plate 10. In this embodiment, the flame, smoke or gas discharged from the cell anti-explosion valve 201 enters the air passage in the side beam 20 through the inlet vents 31 on the side beam 20, and then diffuses into the air passage in the base plate 10 from the air passage in the side beam 20. When gas pressure inside the air passage reaches a certain value, the battery-pack anti-explosion valve 40 on the base plate 10 is opened, so that the flame, smoke or gas that accumulates in the air passage is discharged to the outside of the battery pack through the battery-pack anti-explosion valve 40.

In the present disclosure, the battery tray 100 may be rectangular, including a rectangular base plate 10 and a side beam 20 disposed around the base plate 10. The side beam 20 and the base plate 10 may be made an integral structure, or may be made a split-type structure. For example, the side beam 20 is mounted around the base plate by soldering or other processes. The side beam 20 may be an integral structure, and may be formed by four side beams 20 soldered head-to-tail or connected by other processes. The partition plates 30 and the base plate 10 may be made an integral structure, or may be made a split-type structure. For example, the partition plates 30 are connected to the base plate 10 by soldering or other processes.

In the above first to twelfth embodiments, the partition plates 30 are disposed inside the battery tray 100, the partition plates 30 function to reinforce the battery tray 100, and at least a part of the inlet vents 31 are provided on the partition plates 30. In the above thirteenth to sixteenth embodiments, whether to dispose partition plates inside the battery tray is not particularly limited. There may be no partition plate 30 disposed inside the battery tray, in which case the inlet vents 31 may be directly provided on at least one of the side beam 20 and the base plate 10.

Figure 6:
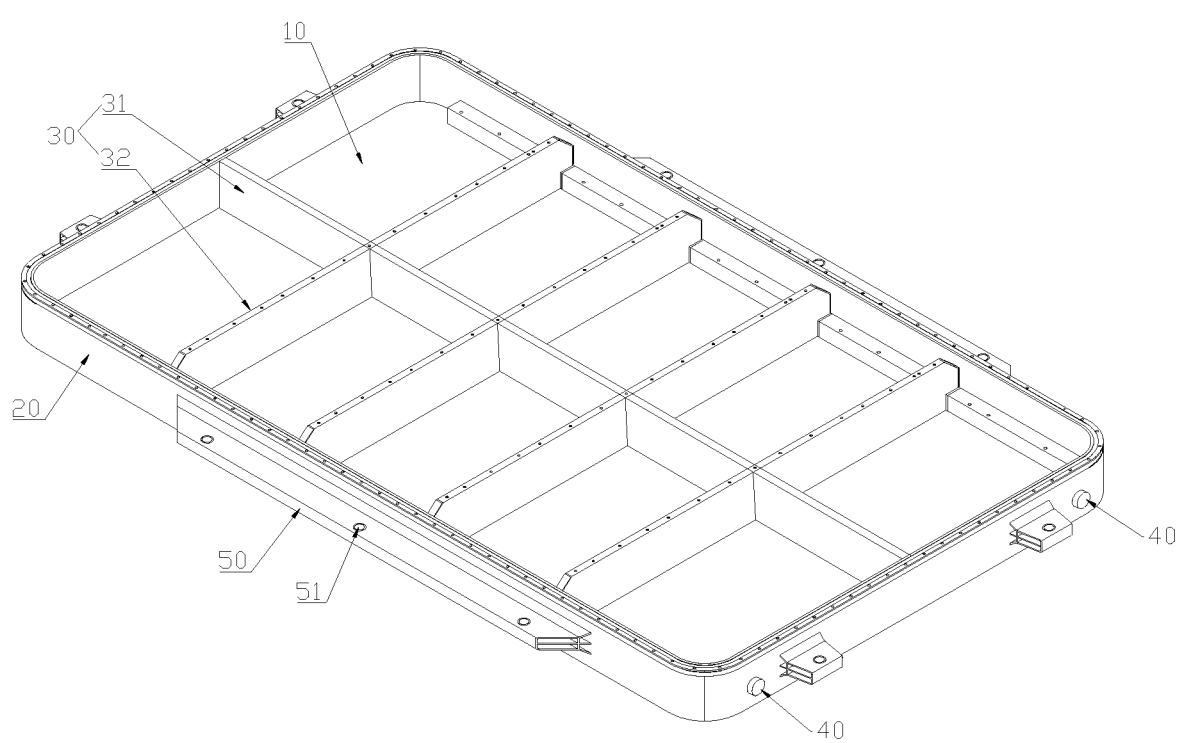
FIG. 6 is a schematic three-dimensional diagram of a battery tray according to another embodiment of the present invention, where no inlet vent is shown.

In the above first to twelfth embodiments, the partition plates 30 may be arranged in the battery tray based on any suitable arrangement manner, which is not limited in the present disclosure. As shown in FIG. 1A and FIG. 1B, the partition plates 30 may be parallel to and spaced apart from each other, the partition plates 30 are perpendicular to the base plate 10, and two ends of each of the partition plates 30 are connected to the side beam 20. As shown in FIG. 6, the partition plates 30 may include one or more longitudinal partition plates 31 extending along a length direction of the tray body and one or more transverse partition plates 32 extending along a width direction of the tray body. The longitudinal partition plate 31 and the transverse partition plate 32 cross each other. Two ends of the longitudinal partition plate 31 are connected to the side beam 20. Two ends of the transverse partition plate 32 are connected to the side beam 20.

In the present disclosure, the air passage formed inside the tray body is used for receiving and storing the flame, smoke or gas discharged from the battery cells 200, the flame, smoke or gas discharged from all the battery cells 200 can enter the air passage through the corresponding inlet vents 31, and the battery-pack anti-explosion valve 40 is used for controlling the discharging of gas from the air passage.

The number of air passages is not limited in the present disclosure. Each battery cell 200 may correspond to one air passage, or a plurality of battery cells 200 may share one air passage.

In the above first embodiment, the side beam 20 may be formed therein with one air passage, and the air passage is in communication with the air passage in each of the partition plates 30; or the side beam 20 may be formed therein with a plurality of air passages independent of each other, and the air passage in each of the partition plates 30 is in communication with only the corresponding air passage in the side beam 20.

In the above second embodiment, the base plate 10 may be formed therein with one air passage, and the air passage is in communication with the air passage in each of the partition plates 30; or the base plate 10 may be formed therein with a plurality of air passages independent of each other, and the air passage in each of the partition plates 30 is in communication with only the corresponding air passage in the base plate 10.

In the above thirteenth embodiment, the side beam 20 may be formed therein with one air passage, and all the battery cells 200 share the air passage, i.e., the inlet vents 31 and the at least one exhaust vent are all in communication with the air passage; or the side beam 20 may be formed therein with a plurality of air passages independent of each other, and each of the air passages corresponds to a plurality of battery cells 200, i.e., each of the air passages has a plurality of inlet vents 31 and at least one exhaust vent; or the side beam 20 may be formed therein with a plurality of air passages independent of each other, and each of the air passages corresponds to one battery cell 200, i.e., each of the air passages has one inlet vent 31 and one exhaust vent.

In the above fourteenth embodiment, the base plate 10 may be formed therein with one air passage, and all the battery cells 200 share the air passage, i.e., the inlet vents 31 and the at least one exhaust vent are all in communication with the air passage; or the base plate 10 may be formed therein with a plurality of air passages independent of each other, and each of the air passages corresponds to a plurality of battery cells 200, i.e., each of the air passages has a plurality of inlet vents 31 and at least one exhaust vent; or the base plate 10 may be formed therein with a plurality of air passages independent of each other, and each of the air passages corresponds to one battery cell 200, i.e., each of the air passages has one inlet vent 31 and one exhaust vent.

In the present disclosure, each of the air passages corresponds to a plurality of battery cells 200, that is to say, a plurality of battery cells 200 may share one air passage, which can reduce the number of exhaust vents and the number of battery-pack anti-explosion valves 40, so that the number of exhaust vents and the number of battery-pack anti-explosion valves 40 can be less than the number of inlet vents 31, thereby reducing the processing difficulty of the tray body, reducing the number of battery-pack anti-explosion valves 40 required, and reducing the manufacturing costs. Specifically, the number of battery-pack anti-explosion valves 40 may be one, two, three or more, which is not limited in the present disclosure.

In the above first and second embodiments, as shown in FIG. 1C and FIG. 1D, the number of gaskets 300 may be the same as the number of partition plates 30, the gaskets 300 correspond one-to-one to the partition plates 30, and each of the gasket 300 is disposed between the corresponding partition plate 30 and battery cell 200. The gaskets 300 may be integrally formed, or may be disposed separately. The gaskets are disposed separately, so as to match the use of battery modules having different numbers of battery cells 200. The material of the gaskets is not particularly limited in the present disclosure, which specifically may be one or a combination of a polyurethane foam material, a silicone foam, and a flame-retardant polypropylene foam material.

In the present disclosure, as shown in FIG. 1B, an upper edge of the side beam 20 may be provided with a plurality of first mounting holes 21, and bolts pass through the first mounting holes 21 and are connected to the cover plate, so as to achieve the connection between the side beam 20 and the cover plate. In the above first to fifth embodiments, as shown in FIG. 1B, upper edges of the partition plates 30 may be flush with an upper edge of the side beam 20, the upper edges of the partition plates 30 may be provided with second mounting holes 32, and bolts pass through the second mounting holes 32 and are connected to the cover plate, so as to achieve the connection between the partition plates 30 and the cover plate.

In the present disclosure, as shown in FIG. 1B, one or more mounting blocks 50 may be disposed on an outer side of the side beam 20, one or more third mounting holes 51 are provided on the mounting blocks 50, and bolts pass through the third mounting holes 51 and are connected to the bottom of a vehicle 500, so as to fix the battery tray 100 to the bottom of the vehicle 500.

In the prior art, at least one of a smoke sensor and a gas sensor is disposed inside the battery tray, and when a battery cell 200 relatively distant from at least one of the smoke sensor and the gas sensor undergoes a thermal runaway and the anti-explosion valve is opened to release the gas or smoke, the large volume of the tray causes the released gas or smoke to diffuse inside the battery tray and thus be diluted, and consequently at least one of the smoke sensor and the gas sensor may be unable to detect the released gas or smoke in time, resulting in a decrease in sensitivity. In contrast, in the present disclosure, a smoke sensor or a gas sensor (not shown) may be disposed in the air passage of the battery tray 100, the space of the air passage is obviously smaller than the volume of the battery tray, and the air passage discharges the corresponding smoke or gas along a predetermined direction. Therefore, once a cell anti-explosion valve 201 is opened, at least one of the smoke sensor and the gas sensor senses the corresponding smoke or gas, and the smoke sensor or the gas sensor feeds back a signal to a vehicle control system, to caution the user to make a response or start gaseous fire suppression or other actions of the battery pack, thereby improving the safety performance of the battery pack. The positions at which at least one of the smoke sensor and the gas sensor are disposed inside the air passage and the numbers of at least one of smoke sensors and gas sensors are not particularly limited in the present disclosure. At least one of the smoke sensor and the gas sensor are disposed close to the position of the exhaust vent, so that the corresponding gas or smoke can be detected more sensitively.

According to another aspect of the present disclosure, a vehicle is provided. The vehicle includes the above-mentioned power battery pack.

The implementations of the present disclosure are described in detail above with reference to the accompanying drawings. However, the present disclosure is not limited to the specific details in the foregoing implementations, a plurality of simple deformations may be made to the technical solution of the present disclosure within a range of the technical concept of the present disclosure, and these simple deformations fall within the protection scope of the present disclosure.

It should be additionally noted that, the specific technical features described in the foregoing specific implementations may be combined in any proper manner in a case without conflict. To avoid unnecessary repetition, various possible combination manners are not described in the present disclosure.

In addition, different implementations of the present disclosure may also be arbitrarily combined without departing from the idea of the present disclosure, and these combinations shall still be regarded as content disclosed in the present disclosure.

What is claimed is:

1. A battery tray, comprising a tray body, wherein the tray body comprises a base plate, a side beam disposed around the base plate, and a partition plate disposed on the base plate, the side beam and the base plate defining an accommodating space for battery cells and the partition plate dividing the accommodating space into regions for placing battery cells;
   wherein the base plate and the partition plate are each formed with an air passage therein, the air passages being in communication with each other, the base plate and the partition plate each include at least one inlet vent, and the base plate includes at least one exhaust vent;
   wherein each inlet vent is configured to introduce a flame, smoke or gas discharged from one of the battery cells into one of the air passages and the exhaust vent is configured to discharge the flame, smoke or gas inside the air passages.

2. The battery tray according to claim 1, wherein the base plate is a hollow structure, and the hollow structure serves as the air passage of the base plate.

3. The battery tray according to claim 2, wherein the battery tray further comprises a battery-pack anti-explosion valve, and the exhaust vent is blocked by the battery-pack anti-explosion valve.

4. The battery tray according to claim 3, wherein the battery tray further comprises at least one of a smoke sensor and a gas sensor, and at least one of the smoke sensor and the gas sensor is disposed in one of the air passages.

5. A power battery pack, comprising several battery cells, a cover plate, and the battery tray according to claim 4, wherein the cover plate is sealedly connected to the battery tray to jointly form an enclosed space for accommodating the several battery cells.

6. The battery tray according to claim 2, wherein the battery tray further comprises at least one of a smoke sensor and a gas sensor, and at least one of the smoke sensor and the gas sensor is disposed in one of the air passages.

7. The battery tray according to claim 1, wherein the battery tray further comprises a battery-pack anti-explosion valve, and the exhaust vent is blocked by the battery-pack anti-explosion valve.

8. The battery tray according to claim 7, wherein the battery tray further comprises at least one of a smoke sensor and a gas sensor, and at least one of the smoke sensor and the gas sensor is disposed in one of the air passages.

9. The battery tray according to claim 1, wherein the battery tray further comprises at least one of a smoke sensor and a gas sensor, and at least one of the smoke sensor and the gas sensor is disposed in one of the air passages.

10. A power battery pack, comprising several battery cells, a cover plate, and the battery tray according to claim 1, wherein the cover plate is sealedly connected to the battery tray to jointly form an enclosed space for accommodating the several battery cells.

11. The power battery pack according to claim 10, wherein each of the battery cells has a cell anti-explosion valve, each cell anti-explosion valve being disposed in alignment with one of the inlet vents such that a flame, smoke or gas discharged from each of the cell anti-explosion valves enters one of the air passages through the corresponding inlet vent, the power battery pack further comprises a gasket, the gasket is disposed between the battery cells and the base plate, the gasket is provided with through holes, the through holes correspond one-to-one to the inlet vents of the base plate, and the through hole is located between the corresponding inlet vent and cell anti-explosion valve.

12. The battery tray according to claim 1, wherein the exhaust vent is disposed on a bottom surface of the base plate.

13. The battery tray according to claim 1, wherein a longitudinal edge of the partition plate is connected to the base plate.

14. The battery tray according to claim 1, wherein first and second ends of the partition plate are connected to the side beam.

15. The battery tray according to claim 1, wherein each region of the accommodating space is configured to receive a row of cells in facing relationship to each other.

16. The battery tray according to claim 1, wherein the side beam is formed with an air passage therein, the air passage of the side beam being in communication with at least one of the air passage of the partition plate and the air passage of the base plate.

17. The battery tray according to claim 16, wherein the side beam is a hollow structure and the hollow structure serves as the air passage.

18. The battery tray according to claim 17, wherein the battery tray further comprises a battery-pack anti-explosion valve, and the exhaust vent is blocked by the battery-pack anti-explosion valve.

19. The battery tray according to claim 17, wherein the battery tray further comprises at least one of a smoke sensor and a gas sensor, and at least one of the smoke sensor and the gas sensor is disposed in the air passage.

20. The battery tray according to claim 16, wherein the battery tray further comprises a battery-pack anti-explosion valve, and the exhaust vent is blocked by the battery-pack anti-explosion valve.

21. The battery tray according to claim 16, wherein the battery tray further comprises at least one of a smoke sensor and a gas sensor, and at least one of the smoke sensor and the gas sensor is disposed in the air passage.

* * * * *